ns009883217B2

United States Patent
Hwang et al.

(10) Patent No.: US 9,883,217 B2
(45) Date of Patent: Jan. 30, 2018

(54) SIGNAL TRANSMISSION AND RECEPTION DEVICE AND SIGNAL TRANSMISSION AND RECEPTION METHOD

(71) Applicant: LG ELECTRONICS INC., Seoul (KR)

(72) Inventors: Soojin Hwang, Seoul (KR); Jinpil Kim, Seoul (KR); Hyunmook Oh, Seoul (KR); Jongyeul Suh, Seoul (KR)

(73) Assignee: LG ELECTRONICS INC., Seoul (KR)

(*) Notice: Subject to any disclaimer, the term of this patent is extended or adjusted under 35 U.S.C. 154(b) by 125 days.

(21) Appl. No.: 14/763,128

(22) PCT Filed: Feb. 27, 2014

(86) PCT No.: PCT/KR2014/001620
§ 371 (c)(1),
(2) Date: Jul. 23, 2015

(87) PCT Pub. No.: WO2014/133336
PCT Pub. Date: Sep. 4, 2014

(65) Prior Publication Data
US 2015/0358651 A1   Dec. 10, 2015

Related U.S. Application Data

(60) Provisional application No. 61/770,317, filed on Feb. 28, 2013.

(51) Int. Cl.
*H04N 21/2362* (2011.01)
*H04N 21/2343* (2011.01)
(Continued)

(52) U.S. Cl.
CPC ..... *H04N 21/2362* (2013.01); *H04N 21/2383* (2013.01); *H04N 21/23614* (2013.01);
(Continued)

(58) Field of Classification Search
CPC .......... H04N 21/23614; H04N 21/816; H04N 21/4348; H04N 21/234327; H04N 7/015; H04N 19/59
See application file for complete search history.

(56) References Cited

U.S. PATENT DOCUMENTS 8,421,915 B2 * 4/2013 Yamashita ............. H04N 7/015
348/14.12
2003/0135539 A1   7/2003 Kondo et al.
(Continued)

FOREIGN PATENT DOCUMENTS

CA    2 844 361 A1   1/2013
EP    2744214 A2     6/2014
(Continued)

OTHER PUBLICATIONS

ATSC Recommended Practice: Program and System Information Protocol Implementation Guidelines for Broadcasters, Dec. 2009, available at http://atsc.org/wp-content/uploads/2015/03/Program-and-system-information-protocol-implementation-guidelines-for-broadcaster.pdf.*

(Continued)

*Primary Examiner* — Brain T Pendleton
*Assistant Examiner* — Krista A Contino Saumby
(74) *Attorney, Agent, or Firm* — Birch, Stewart, Kolasch & Birch, LLP

(57) ABSTRACT

The present invention relates to a signal transmission and reception device and a signal transmission and reception method. The signal transmission method, according to one embodiment of the present invention, comprises the steps of: encoding UHD video data; encoding signaling information for signaling a UHD broadcasting service based on the encoded UHD video data; and multiplexing the encoded video data and signaling information, and transmitting the multiplexed data, wherein the signaling information con-
(Continued)

tains identification information on a clear QAM UHD service.

15 Claims, 17 Drawing Sheets

(51) Int. Cl.
  *H04N 21/81* (2011.01)
  *H04N 21/434* (2011.01)
  *H04N 21/438* (2011.01)
  *H04N 21/2383* (2011.01)
  *H04N 21/236* (2011.01)
  *H04N 21/431* (2011.01)

(52) U.S. Cl.
  CPC ... *H04N 21/234327* (2013.01); *H04N 21/431* (2013.01); *H04N 21/4345* (2013.01); *H04N 21/4348* (2013.01); *H04N 21/4382* (2013.01); *H04N 21/4383* (2013.01); *H04N 21/816* (2013.01)

(56) References Cited

U.S. PATENT DOCUMENTS

| | | |
|---|---|---|
| 2006/0023881 A1 | 2/2006 | Akiyama et al. |
| 2007/0266153 A1* | 11/2007 | Barrett ............ H04N 7/106 709/225 |
| 2008/0313692 A1* | 12/2008 | Yun ............ H04N 21/235 725/131 |
| 2009/0083279 A1* | 3/2009 | Hasek ............ H04L 67/2823 |
| 2009/0313674 A1 | 12/2009 | Ludvig et al. |
| 2011/0154425 A1* | 6/2011 | Kim ............ H04N 21/2385 725/116 |
| 2013/0242050 A1 | 9/2013 | Choi et al. |
| 2014/0168512 A1 | 6/2014 | Suh et al. |
| 2014/0355989 A1* | 12/2014 | Finkelstein ......... H04J 14/0232 398/72 |

FOREIGN PATENT DOCUMENTS

| | | |
|---|---|---|
| JP | 2006-41848 A | 2/2006 |
| JP | 2008-154149 A | 7/2008 |
| JP | 2010-74238 A | 4/2010 |
| KR | 10-2011-0068821 A | 6/2011 |
| KR | 10-2012-0058700 A | 6/2012 |
| KR | 10-2013-0018208 A | 2/2013 |
| WO | WO 02/059785 A1 | 8/2002 |
| WO | WO 2013/015596 A2 | 1/2013 |

OTHER PUBLICATIONS

ATSC, "ATSC Recommended Practice: Program and System Information Protocol Implementation Guidelines for Broadcasters," Document A/69: 2009, Dec. 25, 2009, XP030001581, p. 1-87 (88 pages).

* cited by examiner

FIG. 3

| SYNTAX | NUMBER OF BITS | FORMAT |
|---|---|---|
| PSIP_section( ){ | | |
|   table_id | 8 | uimsbf |
|   section_syntax_indicator | 1 | '1' |
|   private_indicator | 1 | '0' |
|   Reserved | 2 | '11' |
|   section_length | 12 | uimsbf |
|   table_id_extension | 16 | uimsbf |
|   Reserved | 2 | '11' |
|   version_number | 5 | uimsbf |
|   current_next_indicator | 1 | bslbf |
|   section_number | 8 | uimsbf |
|   last_section_number | 8 | uimsbf |
|   protocol_version | 8 | uimsbf |
|   PSIP_table_data() | * | |
|   CRC_32 | 32 | rpchof |
| } | | |

| | | | PID | REFERENCE |
|---|---|---|---|---|
| 0x00 | Program Association Table (PAT) | | 0 | |
| 0x01 | Conditional Access Table (CAT) | | 1 | |
| 0x02 | Ts Program Map Table (PMT) | | per PAT | |
| 0x03-0x3F | [ISO Reserved] | | | |
| 0x40-0xBF | User Private Sections: [User Private] | | | |
| 0xC0-0xC6 | Other documents: [ATSC coordinated values which are defined in other system] | | | |
| | PSIP Tables: | | | |
| 0xC7 |   Master Guide Table (MGT) | | 0x1FFB | |
| 0xC8 |   Terrestrial Virtual Channel Table (TVCT) | | 0x1FFB | |
| 0xC9 |   Cable Virtual Channel Table (CVCT) | | 0x1FFB | |
| 0xCA |   Rating Region Table (RRT) | | 0x1FFB | |
| 0xCB |   Event Information Table (EIT) | | per MGT | |
| 0xCC |   Extended Text Table (ETT) | | per MGT | |
| 0xCD |   System Time Table (STT) | | 0x1FFB | |
| 0xCE-0xD2 | [Reserved] | | | |
| | PSIP Tables: | | | |
| 0xD3 | Directed Channel Change Table (DCCT) | | 0x1FFB | |
| 0xD4 | Directed Channel Change Selection Code Table (DCCSCT) | | 0x1FFB | |
| 0xD5-0xDF | [ATSC coordinated values which are defined in other system] | | | |
| 0xE0-0xE5 | [Used in other systems] | | | |
| 0xE6-0xFE | [Reserved for future ATSC use] | | | |

FIG. 4

| Syntax | No. of Bits | Format |
|---|---|---|
| cable_virtual_channel_table_section(){ | | |
|   table_id | 8 | 0xC9 |
|   section_syntax_indicator | 1 | '1' |
|   private_indicator | 1 | '1' |
|   reserved | 2 | '11' |
|   section_length | 12 | uimsbf |
|   transport_stream_id | 16 | uimsbf |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   protocol_version | 8 | uimsbf |
|   num_channels_in_section | 8 | uimsbf |
|   for (i=0; i< num_channels_in_section; i++) { | | |
|     short_name | 7'16 | uimsbf |
|     reserved | 4 | '1111' |
|     major_channel_number | 10 | uimsbf |
|     minor_channel_number | 10 | uimsbf |
|     modulation mode | 8 | uimsbf |
|     carrier_frequency | 32 | uimsbf |
|     channel_TSID | 16 | uimsbf |
|     program_number | 16 | uimsbf |
|     ETM_location | 2 | uimsbf |
|     access_controlled | 1 | bslbf |
|     hidden | 1 | bslbf |
|     path_select | 1 | bslbf |
|     out_of_band | 1 | bslbf |
|     hide_guide | 1 | bslbf |
|     reserved | 3 | '111' |
|     service_type | 6 | uimsbf |
|     source_id | 16 | uimsbf |
|     reserved | 6 | '111111' |
|     descriptors_length | 10 | uimsbf |
|     for (i=0; i<N; i++) { | | |
|       descriptor() | | |
|     } | | |
|   } | | |
| } | | | service_type → Parameterized service (0x07) OR extended parameterized service (0x09) OR new DTV service-UHDTV (0x10)

descriptor() → ATSC_private_information_descriptor + UHD_descriptor

FIG. 5

| Syntax | Description |
|---|---|
| cable_virtual_channel_table_section(){<br>  transport_stream_id<br>  .<br>  .<br>  .<br>  for (i=0; i< num_channels_in_section; i++) {<br>    major_channel_number<br>    minor_channel_number<br>    modulation_mode<br>    carrier_frequency<br>    channel_TSID<br>    .<br>    .<br>    .<br>    service_type<br><br>    source_id<br>    .<br>    .<br>    .<br>    for (i=0; i<N; i++) {<br>      service_location_descriptor()<br>      ATSC_private_information_descriptor()<br>      UHD_descriptor( )<br>      .<br>      .<br>      .<br>    }<br>  }<br>} | MPEG-2 TRANSPORT STREAM ID IN PAT<br><br><br><br>two-part or a one-part virtual channel number<br><br>MODULATION MODE OF TRANSMISSION CARRIER OF VIRTUAL CHANNEL<br><br>MPEG-2 TRANSPORT STREAM ID VALUE OF TS FOR TRANSMITTING MPEG-2 PROGRAM ASSOCIATED WITH VIRTUAL CHANNEL<br><br>ATSC DN: (0x02)<br>UHD SERVICE PROVISION: SET TO PARAMETERIZED SERVICE (OX07), EXTENDED PARAMETERIZED SERVICE (OX09) OR NEW DTV SERVICE-UHDTV (0X10) PROGRAMMING SOURCE ID CONNECTED TO VIRTUAL CHANNEL<br><br><br>TYPE OF ELEMENT STREAM<br>DETERMINE CHANNEL ENCRYPTION AND TRANSMISSION OF BROADCAST TRANSMISSION INFORMATION FOR UHD BROADCAST RESTORATION |

FIG. 6

| Syntax | No. of Bits | Format |
|---|---|---|
| service_location_descriptor(){ | | |
|    descriptor_tag | 8 | 0xA1 |
|    descriptor_length | 8 | uimsbf |
|    reserved | 3 | '111' |
|    PCR_PID | 13 | uimsbf |
|    number_elements | 8 | uimsbf |
|    for (i=0; i< number_elements; i++) { | | |
|       stream_type | 8 | uimsbf |
|       reserved | 3 | '111' |
|       elementary_PID | 13 | uimsbf |
|       ISO_639_language_code | 8'3 | uimsbf |
|    } | | |
| } | | |

STREAM_TYPE: WHICH CODEC IS USED TO COMPRESS BROADCAST SERVICE IS INDICATED VIA SERVICE (CHANNEL) USING STREAM_TYPE FIELD OF SERVICE_LOCATION_DESCRIPTOR IN CVCT. STREAM_TYPE VALUE IS ALLOCATED AS FOLLOWS.

0x1B- VIDEO USING AVC/H.264
  0x24- VIDEO USING HEVC

FIG. 7

| SYNTAX | NUMBER OF BITS | FORMAT |
|---|---|---|
| ATSC_private_information_descriptor (){ | | |
|   descriptor_tag | 8 | 0xAD |
|   descriptor_length | | |
|   format_identifier | | |
|   private_info_count | | |
|   for (i=0; i<private_info_count; i++){ | | |
|     private_info_type | | |
|     private_info_length | 8 | 0x02 |
|     ch_frequency_version_number | 8 | uimsbf |
|     channel_mode | 4 | uimsbf |
|     resolution | 4 | uimsbf |
|   } | | |
| } | | |

| channel_mode | MEANING | TV OPERATION |
|---|---|---|
| 0 | UNENCRYPTED CHANNEL (CLEAR CHANNEL) | PROCESSED IN TV |
| 1 | ENCRYPTED CHANNEL (SCRAMBLING CHANNEL) | IGNORED IN TV |
| 2 | VIDEO ON DEMAND CHANNEL (VOD CHANNEL) | IGNORED IN TV |
| 3-15 | reserved | |

| resolution | MEANING |
|---|---|
| 0 | Reserved |
| 1 | SD CHANNEL (WITHOUT DUPLICATE CHANNEL) |
| 2 | SD CHANNEL (WITH DUPLICATE HD CHANNEL) |
| 3 | SD CHANNEL (WITH DUPLICATE UHD CHANNEL) |
| 4 | HD CHANNEL (WITHOUT DUPLICATE CHANNEL) |
| 5 | HD CHANNEL (WITH DUPLICATE SD CHANNEL) |
| 6 | HD CHANNEL (WITH DUPLICATE UHD CHANNEL) |
| 7 | UHD CHANNEL (WITHOUT DUPLICATE CHANNEL) |
| 8 | UHD CHANNEL (WITH DUPLICATE SD CHANNEL) |
| 9 | UHD CHANNEL (WITH DUPLICATE HD CHANNEL) |
| 10-15 | Reserved |

FIG. 8

| Syntax | No. of bits | Format |
|---|---|---|
| UHD_descriptor ( ) { | | |
|    descriptor_tag | 8 | uimsbf |
|    descriptor_length | 5 | uimsbf |
|    UHD_metadata ( ) | | |
| } | | |

| Syntax | No. of bits | Format |
|---|---|---|
| UHD_metadata ( ) { | | |
|    UHD_video_codec_type | 8 | uimsbf |
|    UHD_video_profile | 8 | uimsbf |
|    UHD_video_level | 8 | uimsbf |
|    UHD_video_resolution | 3 | uimsbf |
|    UHD_video_framerate | 3 | uimsbf |
|    UHD_video_bitdepth | 2 | uimsbf |
|    UHD_video_chroma_sampling | 2 | uimsbf |
|    UHD_video_aspectratio | 2 | uimsbf |
|    UHD_video_tier | 4 | uimsbf |
| } | | |

FIG. 9

| Syntax | No. of Bits | Format |
|---|---|---|
| terrestrial_virtual_channel_table_section(){ | | |
|   table_id | 8 | 0xC8 |
|   section_syntax_indicator | 1 | '1' |
|   private_indicator | 1 | '1' |
|   reserved | 2 | '11' |
|   section_length | 12 | uimsbf |
|   transport_stream_id | 16 | uimsbf |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   protocol_version | 8 | uimsbf |
|   num_channels_in_section | 8 | uimsbf |
|   for (i=0; i< num_channels_in_section; i++) { | | |
|     short_name | 7'16 | uimsbf |
|     reserved | 4 | '1111' |
|     major_channel_number | 10 | uimsbf |
|     minor_channel_number | 10 | uimsbf |
|     modulation mode | 8 | uimsbf |
|     carrier_frequency | 32 | uimsbf |
|     channel_TSID | 16 | uimsbf |
|     program_number | 16 | uimsbf |
|     ETM_location | 2 | uimsbf |
|     access_controlled | 1 | bslbf |
|     hidden | 1 | bslbf |
|     reserved | 2 | '11' |
|     hide_guide | 1 | bslbf |
|     reserved | 3 | '111' |
|     service_type | 6 | uimsbf |
|     source_id | 16 | uimsbf |
|     reserved | 6 | '111111' |
|     descriptors_length | 10 | uimsbf |
|     for (i=0; i<N; i++) { | | |
|       descriptor() | | |
|     } | | |
|   } | | |
|   reserved | 6 | '111111' |
|   additional_descriptors_length | 10 | uimsbf |
|   for (j=0; j<N; j++) { | | |
|     additional_descriptor() | | |
|   } | | | service_type: Parameterized service (0x07) MAY BE SET TO PARAMETERIZED SERVICE (0x07), EXTENDED PARAMETERIZED SERVICE (0x09) OR NEW DTV SERVICE-UHDTV (0x10)

descriptor(): DESCRIBED BELOW

FIG. 10

| Service scenario | service_type | Descriptors |
|---|---|---|
| UHD | 0x07 | Component list descriptor<br>Service location descriptor<br>UHD descriptor |
| | 0x09 | Component list descriptor<br>Parameterized service descriptor<br>Service location descriptor |
| | 0x10 | UHD descriptor<br>Service location descriptor |
| Non-UHD | 0x02 | Service location descriptor<br>UHD linkage descriptor |
| | 0x07 | Component list descriptor<br>Service location descriptor<br>UHD linkage descriptor |
| | 0x09 | Component list descriptor<br>Parameterized service descriptor<br>Service location descriptor<br>UHD linkage descriptor |

FIG. 12

| Syntax | No. of bits | Format |
|---|---|---|
| component_list_descriptor( ) { | | |
|     descriptor_tag | 8 | 0xBB |
|     descriptor_length | 8 | uimsbf |
|     alternate | 1 | bslbf |
|     component_count | 7 | uimsbf |
|     for (i=0; i<component_count; i++) { | | |
|         stream_type | 8 | uimsbf |
|         format_identifier | 32 | uimsbf |
|         length_of_details | 8 | uimsbf |
|         stream_info_details( ) | var | |
|     } | | |
| } | | |

→ SET TO 0x24 IN CASE OF HEVC

| Syntax | No. of bits | Format |
|---|---|---|
| stream_info_details ( ) { | | |
|     reserved | 2 | bslbf |
|     profile | 5 | uimsbf |
|     tier | 1 | uimsbf |
|     level | 8 | uimsbf |
| } | | |

FIG. 13

| Syntax | No. of bits | Format |
|---|---|---|
| parameterized_service_descriptor ( ) { | | |
|     descriptor_tag | 8 | 0x8D |
|     descriptor_length | 8 | uimsbf |
|     application_tag | 8 | bslbf |
|     application_data ( ) | var | |
| } | | |

→ 0x02 MEANS UHD SERVICE

| Syntax | No. of bits | Format |
|---|---|---|
| application_data (0x02) { | | |
|     UHD_metadata ( ) | 8 | uimsbf |
| } | | |

FIG. 14

| Syntax | No. of Bits | Format |
|---|---|---|
| directed_channel_change_table_section(){ | | |
|   table_id | 8 | 0xD3 |
|   section_syntax_indicator | 1 | '1' |
|   private_indicator | 1 | '1' |
|   reserved | 2 | '11' |
|   section_length | 12 | uimsbf |
|   dcc_subtype | 8 | 0x00 |
|   dcc_id | 8 | uimsbf |
|   reserved | 2 | '11' |
|   version_number | 5 | uimsbf |
|   current_next_indicator | 1 | '1' |
|   section_number | 8 | 0x00 |
|   last_section_number | 8 | 0x00 |
|   protocol_version | 8 | uimsbf |
|   dcc_test_count | 8 | uimsbf |
|   for (i=0; i< dcc_test_count; i++) { | | |
|     dcc_context | 1 | uimsbf |
|     reserved | 3 | '111' |
|     dcc_from_major_channel_number | 10 | uimsbf |
|     dcc_from_minor_channel_number | 10 | uimsbf |
|     reserved | 4 | '1111' |
|     dcc_to_major_channel_number | 10 | uimsbf |
|     dcc_to_minor_channel_number | 10 | uimsbf |
|     dcc_start_time | 32 | uimsbf |
|     dcc_end_time | 32 | uimsbf |
|     dcc_term_count | 8 | uimsbf |
|     for (j=0; j<dcc_term_count; j++) { | | |
|       dcc_selection_type | 8 | uimsbf |
|       dcc_selection_id | 64 | uimsbf |
|       reserved | 6 | '111111' |
|       dcc_term_descriptors_length | 10 | uimsbf |
|       for (k=0; k<N; k++) { | | |
|         dcc_term_descriptor() | | |
|       } | | |
|     } | | |
|     reserved | 6 | '111111' |
|     dcc_test_descriptors_length | 10 | uimsbf |
|     for (j=0; j<N; j++) { | | |
|       dcc_test_descriptors() | | |
|     } | | |

ANOTHER dcc_subtype (0x01) FOR AUTOMATIC CHANNEL CHANGE TO UHD CHANNEL INDEPENDENT OF EXISTING DCC IS SET TO PROVIDE SERVICE dcc_selection_type – ADD UHD SERVICE
dcc_selection_id – DIVIDE TYPE SUCH AS RESOLUTION, FRAME RATE, BIT-DEPTH, ASPECT RATIO, ETC. INDICATING UHD SERVICE RANGE

FIG. 15

Table 6.17 DCC Selection Type Assignments

| dcc_selection_type | Name and Meaning | Value of DCC Selection ID | Test | Logic |
|---|---|---|---|---|
| '0x00 | Unconditional channel change | n.a. | Term always evaluates True. | True |
| '0x01 | Numeric Postal code Inclusion-Inclusion test on numeric postal codes, with Wild-card match on "?" characters | 8 ASCII characters representing a specific or range of numeric character postal codes in the range 00000001 to 00099999. ASCII "?" matches any digit 0-9. | Term evaluates True if the DCCRR postal code matches, in the last five character positions, for those selection ID characters not equal to "?" and False otherwise. if postal code not specified in DCCRR, term evaluates False. | |
| 0x02 | Alphanumeric Postal Code Inclusion-Inclusion test on 8-character alphanumeric postal code, with wild-card match on "?" characters | 8 ASCII characters representing an alphanumeric character postal code comprising 8 characters. ASCII "?" matches 0-9 or A-Z. | Term evaluates True if the DCCRR postal code matches, in all the character positions, for those selection ID characters not equal to "?" and False otherwise. if postal code not specified in DCCRR, term evaluates False. | |
| 0x03-0x04 | Reserved | Reserved | | |
| ⋮ | ⋮ | ⋮ | ⋮ | |
| 0x1D-0x1F | Reserved | Reserved | | |
| '0x20-0x23 | viewer-Direct-select-<br>0x20 corresponds to Button A;<br>0x21 corresponds lo Button B;<br>0x22 corresponds lo Button C; and<br>0x23 corresponds lo Button D. | A 64-bit number associated with a given button choice; used in the VDS "persistence" function, See text. | Tune to the channel associated with the indicated function button if that button is selected. Term always evaluates Tune when viewer presses a Direct Select button. | |
| 0x24-0xFF | Reserved | Reserved | | |

→ dcc_service → 0x24: UHD service

FIG. 16

| Syntax | No. of bits | Format |
|---|---|---|
| dcc_selection_id { | | |
|   UHD_code ( ) { | | |
|     UHD_video_codec_type | 8 | uimsbf |
|     UHD_video_profile | 8 | uimsbf |
|     UHD_video_level | 8 | uimsbf |
|     UHD_video_resolution | 6 | uimsbf |
|     UHD_video_framerate | 10 | uimsbf |
|     UHD_video_bitdepth | 5 | uimsbf |
|     UHD_video_chroma_sampling | 3 | uimsbf |
|     UHD_video_aspectratio | 4 | uimsbf |
|     UHD_tier | 4 | uimsbf |
|     reserved | 8 | bslbf |
|   } | | |
| } | | |

| Syntax | No. of bits | Format |
|---|---|---|
| UHD_linkage_info ( ) { | | |
|     UHD_in_other_mux_flag | 1 | bslbf |
|     if (UHD-in-other-mux-flag=='1') { | | |
|         UHD_transport_stream_id | 16 | |
|         UHD_modulation_mode | 8 | |
|         UHD_carrier_frequency | 32 | |
|     } | | |
|     UHD_channel_TSID | 16 | uimsbf |
|     UHD_source_id | 16 | uimsbf |
|     reserved | 7 | bslbf |
| } | | |

SIGNAL TRANSMISSION AND RECEPTION DEVICE AND SIGNAL TRANSMISSION AND RECEPTION METHOD

CROSS REFERENCE TO RELATED APPLICATIONS

This application is the National Phase of PCT International Application No. PCT/KR2014/001620, filed on Feb. 27, 2014, which claims priority under 35 U.S.C. 119(e) to U.S. Provisional Application No. 61/770,317, filed on Feb. 28, 2013, all of which are hereby expressly incorporated by reference into the present application.

TECHNICAL FIELD

The present invention relates to a signal transmission and reception device and signal transmission and reception method.

BACKGROUND ART

Clear QAM refers to a broadcast service using an unencrypted cable channel. When Clear QAM is used, a user of a DTV having a digital cable broadcast program reception chip mounted therein as well as a subscriber of an existing cable broadcast service can view the broadcasting program of an unencrypted channel. When Clear QAM is introduced, as distribution channels of high-quality content are diversified, content may be diversified. In addition, a high-quality ultra high definition (UHD) broadcast service based on a wide bandwidth is possible.

However, video services having a variety of resolutions are not all supported by Clear QAM. Accordingly, there is a need for technology related to Clear QAM capable of supporting the video services having a variety of resolutions.

DISCLOSURE

Technical Problem

An object of the present invention devised to solve the problem lies in a signal transmission and reception device and a signal transmission and reception method, which are capable of providing high-quality 4 k content based on an existing cable network via a Clear QAM service.

Another object of the present invention devised to solve the problem lies in a signal transmission and reception device and a signal transmission and reception method, which are capable of linking a channel in order to provide a MD broadcast to a UHD receiver, when an existing HD or SD channel overlaps a UHD channel.

Technical Solution

The object of the present invention can be achieved by providing a signal transmission method including encoding ultra high definition (UHD) video data, encoding signaling information for signaling a UHD broadcast service based on the encoded UHD video data, and multiplexing the encoded video data and signaling information and transmitting the multiplexed data, wherein the signaling information includes identification information of a clear quadrature amplitude modulation (QAM) UHD service.

Information on the clear QAM UHD service may be included in an advanced television systems committee (ATSC) private information descriptor of a cable virtual channel table (CVCT).

Information on the clear QAM UHD service may be included in a terrestrial virtual channel table (TVCT).

The signaling information may include a directed channel change table (DCCT) including information on a UHD service and additional information for automatic channel change, and the UHD service may be automatically provided via a UHD channel when a predetermined condition is satisfied in the DCCT.

In another aspect of the present invention, provided herein is a signal reception method including receiving ultra high definition (UHD) video data and signaling information for signaling a UHD broadcast service based on the UHD video data, both of which are included in a multiplexed broadcast signal, demultiplexing the UHD video data and the signaling information, decoding the demultiplexed signaling information, and decoding the demultiplexed UHD video data based on the decoded signaling information, wherein the signaling information includes identification information of a clear quadrature amplitude modulation (QAM) UHD service.

Information on the clear QAM UHD service may be included in an advanced television systems committee (ATSC) private information descriptor in a cable virtual channel table (CVCT).

Information on the clear QAM UHD service may be included in a terrestrial virtual channel table (TVCT).

The signaling information may include a directed channel change table (DCCT) including information on a UHD service and additional information for automatic channel change, and the UHD service may be automatically provided via a UHD channel when a predetermined condition is satisfied in the DCCT.

Advantageous Effects

According to the embodiments of the present invention, it is possible to provide high-quality 4 k content based on an existing cable network via a Clear QAM service.

According to the embodiments of the present invention, it is possible to link a channel in order to provide a UHD broadcast to a UHD receiver, when an existing HD or SD channel overlaps a UHD channel.

DESCRIPTION OF DRAWINGS

FIG. 3 is a diagram showing signaling information according to one embodiment of the present invention.

FIG. 4 is a diagram showing a method of signaling information in order to provide a UHD service via Clear QAM according to one embodiment of the present invention.

FIG. 5 is a diagram illustrating signaling information for providing a UHD service via Clear QAM according to one embodiment of the present invention.

FIG. 6 is a diagram illustrating an example of signaling codec information according to one embodiment of the present invention.

FIG. 7 is a diagram illustrating detailed signaling information for providing a UHD service according to one embodiment of the present invention.

FIG. 8 is a diagram illustrating signaling information for providing a UHD channel according to one embodiment of the present invention.

FIG. 9 is a diagram illustrating signaling information for providing a UHD service via Clear QAM according to another embodiment of the present invention.

FIG. 10 is a diagram illustrating an embodiment of descriptor information according to a service of the present invention.

FIG. 12 is a diagram illustrating signaling information for providing a UHD service according to another embodiment of the present invention.

FIG. 13 is a diagram illustrating other signaling information for providing a UHD service according to another embodiment of the present invention.

FIG. 14 is a diagram showing duplicate channel signaling information according to another embodiment of the present invention.

FIG. 15 is a diagram showing one piece of signaling information for change to a UHD channel according to another embodiment of the present invention.

FIG. 16 is a diagram showing detailed signaling information for change to a UHD channel according to another embodiment of the present invention.

BEST MODE

Hereinafter, embodiments of the present invention will be described with reference to the drawings.

Figure 1:
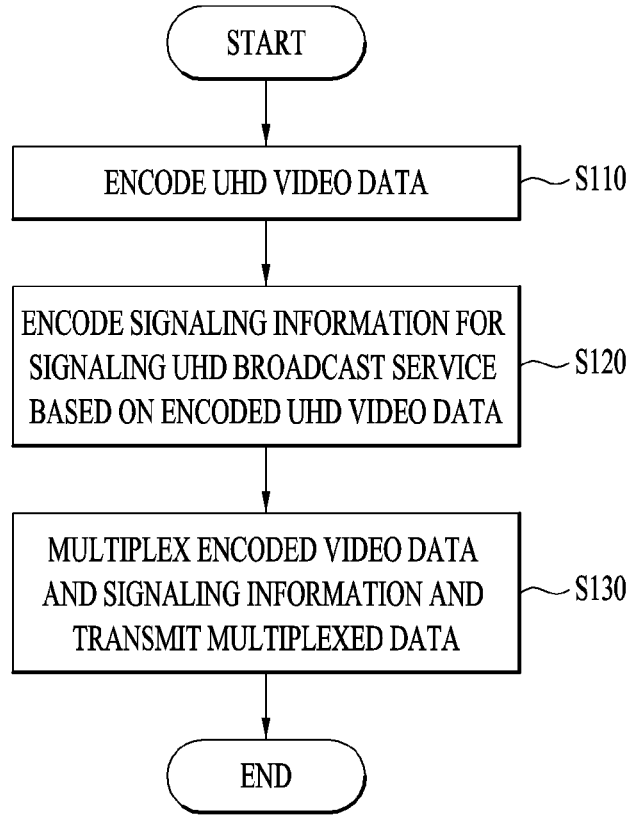
FIG. 1 is a flowchart illustrating a signal transmission method according to one embodiment of the present invention.

FIG. 1 is a flowchart illustrating a signal transmission method according to one embodiment of the present invention.

A signal transmission apparatus may encode ultra high definition (UHD) video data (S110). For example, the UHD video data may have resolution such as 4 k, 8 k, 16 k, etc.

The signal transmission device may encode signaling information for signaling a UHD broadcast service based on the encoded UHD video data (S120). An example of signaling a UHD video service and detailed signaling information will be described below.

The signal transmission device may multiplex the encoded video data and signaling information and transmit the multiplexed signal (S130). The signaling information may include identification information of a clear QAM UHD service. Information on clear QAM service may be included in at least one of a cable virtual channel table (CVCT) and a terrestrial virtual channel table (TVCT).

Hereinafter, an embodiment of identifying a UHD video service and an embodiment of transmitting video signaling information thereof will be described in detail.

Figure 2:
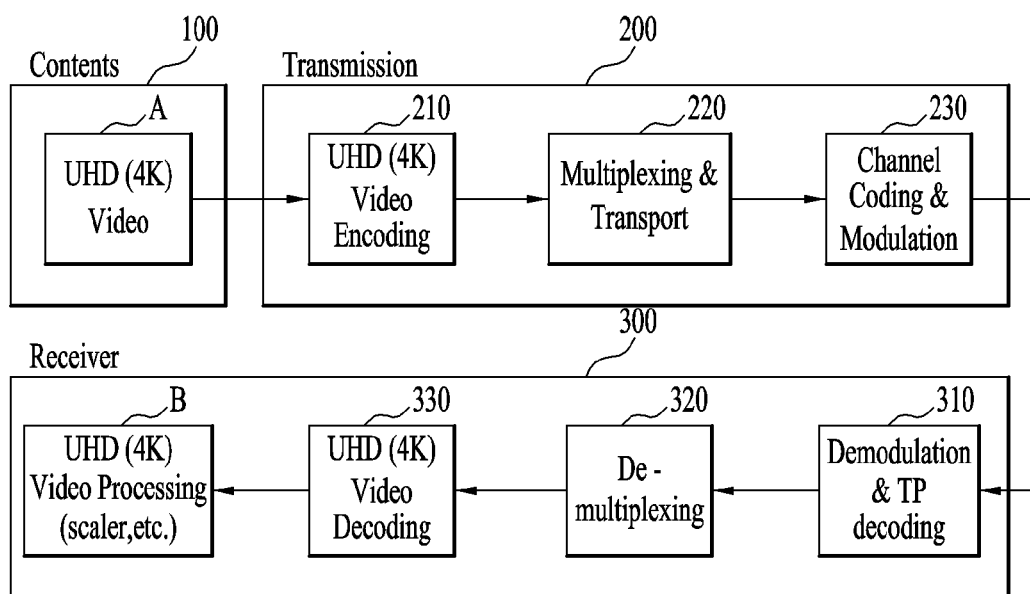
FIG. 2 is a diagram illustrating a UHD broadcast service provision process according to one embodiment of the present invention.

FIG. 2 is a diagram illustrating a UHD broadcast service provision process according to one embodiment of the present invention.

A content provider 100 may create UHD video as content. For example, UHD video A for providing a UHD broadcast service may be created using a camera for capturing 4 k UHD video, etc.

A transmitter 200 may include a video encoder 210, a multiplexer 220 and a channel coding and modulation unit 230.

The video encoder 210 may compress and encode UHD video. For example, a coding method such as HEVC may be used to encode 4 k UHD video.

The multiplexer 220 may multiplex other streams such as a stream of the encoded UHD video and an audio stream and the below-described signaling information and output a transport stream.

The channel coding and modulation unit 230 may perform channel coding and modulation with respect to the transport stream and transmit a broadcast signal.

A receiver 300 may include a demodulator 310, a demultiplexer 320 and a video decoder 330.

The demodulator 310 may receive and demodulate the transmitted broadcast signal and output a transport stream.

The demultiplexer 320 may demultiplex the transport stream and output a video stream, an audio stream and the below-described signaling information.

The video decoder 330 may decode UHD video. For example, 4 k UHD video B may be decoded to perform 4 k UHD video processing. For example, the receiver may perform video processing for a display, such as image quality processing and frame rate conversion of the decoded video.

Hereinafter, an embodiment in which a channel or service delivers information on a UHD broadcast service when the UHD broadcast service is provided in a system will be described. According to the embodiment of the present invention, detailed information on a UHD video element such as profile information of video coding of video having resolution of 4 k may be delivered. In addition, information on a 4 k UHD service or event linked with an existing service or event of HD video may be delivered. In addition, the physical property of the channel as well as the channel number of a channel linked with a channel for transmitting UHD video may be delivered.

The signal transmission device may signal signaling information indicating channel encryption and transmission/non-transmission of the same broadcasting program according to image resolution. At this time, the signaling information may include information indicating that an event to be broadcast currently or later includes a 4 k UHD video signal. In addition, the signal transmission device may deliver information on a 4 k UHD service/event linked with an existing service or event such as an SD or HD service.

For example, information indicating that a 4 k UHD broadcast service is performed in the channel may be signaled using a service_type field of at least one of a terrestrial virtual channel table (TVCT) and a cable virtual channel table (CVCT) included in a PSIP section. Detailed information on 4 k UHD or information on duplicate channel may be signaled using a separate descriptor. Here, the detailed information includes codec information, presence/absence of an unencrypted channel, resolution configuration information for duplicate channel check, UHD video information, UHD channel link information, etc.

FIG. 3 is a diagram showing signaling information according to one embodiment of the present invention. This figure shows a PSIP. Information included in the PSIP will now be described.

A table_id field identifies a table (the value of this 8-bit field shall identify the PSIP table to which this section belongs.) For example, if the table_id field is 0xC8, this means a terrestrial virtual channel table (TVCT) and includes a descriptor related to a PSIP_table_data location. If the table_id field is 0xC9, this means a cable virtual channel table (CVCT) and includes a descriptor related to a PSIP_table_data location.

A section_syntax_indicator field is a 1-bit field set to 1 in order to indicate the long form of an MPEG-2 private_section table. (This 1-bit field shall be set to "1" to always indicate the "long" form of the MPEG-2 private_section table.)

A private_indicator field is a 1-bit field set to 1. (This 1-bit field shall be set to "1".)

A section_length field indicates the length in bytes of a table section following this field. (This is a 12-bit field, the first two bits of which shall be "00". It specifies the number of bytes of the section, starting immediately following the section_length field and including the CRC. The section_length shall not exceed 1021 so that the entire section has a maximum length of 1024 bytes.)

A table_id_extension field is a 16-bit field and is table-dependent. (This is a 16-bit field and is table-dependent. It shall be considered to be logically part of the table_id field providing the scope for the remaining fields.)

A version_number field is a 5-bit field indicating the version number of the table. (This 5-bit field is the version number of the PSIP_section. The version_number shall be incremented by 1 modulo 32 when a change in the information carried within the PSIP_section occurs. When the current_next_indicator is set to "0", then the version_number shall be that of the next applicable PSIP_section with the same table_id, table_id_extension, and section_number.)

A current_next_indicator field is a 1-bit field, which indicates whether this table is currently or next applicable. (A 1-bit field, which when set to "1" indicates that the PSIP_section sent is currently applicable. When the current_next_indicator is set to "1", then the version_number shall be that of the currently applicable PSIP_section. When the bit is set to "0", it indicates that the PSIP_section sent is not yet applicable and shall be the next PSIP_section with the same section_number, table_id_extension, and table_id to become valid.)

A section_number field indicates the number of the section. (This 8-bit field gives the number of the PSIP_section. The section_number of the first section in a PSIP table shall be 0x00. The section_number shall be incremented by 1 with each additional section in PSIP table. The scope of the section_number shall be defined by the table_id and table_id_extension. That is, for each PSIP table and value of the table_id_extension field, there is the potential for the full range of section_number values.)

A last_section_number field identifies the number of the last section. (This 8-bit field specifies the number of the last section. (that is, the section with the highest section_number) of the PSIP table of which this section is a part. Its scope is the same as for the section_number field.)

A protocol_version field has a function for allowing, in the future, a current table type to carry parameters different from parameters defined in the current protocol. (An 8-bit unsigned integer field whose function is to allow, in the future, this table type to carry parameters that may be structured differently than those defined in the current protocol. At present, the only valid value for protocol_version is zero. Non-zero values of protocol_version may be used by a future version of this standard to indicate structurally different tables.)

A CRC_32 field is a 32-bit field containing a CRC value (This is a 32-bit field that contains the CRC value that gives a zero output of the registers in the decoder.)

In order to provide a UHD service via clear QAM, the signal transmission device signals identification information of the UHD service using at least one of a CVCT and a TVCT. As one embodiment, if an ATSC private information descriptor is included in the CVCT, the identification information of the UHD service may be signaled using the ATSC private information descriptor. If the ATSC private information descriptor is not included in the CVCT, UHD channel information may be signaled in the TVCT and information indicating that a 4 k UHD service is performed in the channel may be signaled using a field included in the CVCT or the TVCT. The signal transmission device may signal detailed information on a 4 k UHD service using a descriptor included in the CVCT and the TVCT. If the CVCT is not included, the signal reception device may regard the service as a VOD service and may not receive the service.

FIG. 4 is a diagram showing a method of signaling information in order to provide a UHD service via Clear QAM according to one embodiment of the present invention. Referring to FIG. 4, a signaling method when an ATSC private information descriptor is included in a CVCT is shown.

A table_id field identifies a table. As described with reference to FIG. 3, since the table shown in Table 4 is a CVCT, the value of the table_id is 0x09. The section_syntax_indicator field, the private_indicator field, the section_length field, the version_number field, the current_next_indicator field, the section_number field, the last_section_number field and the protocol_version field have described with reference to FIG. 3 and a description thereof will thus be omitted.

A transport_stream_id field indicates the identifier of an MPEG-2 transport stream (TS) contained in the table. (To distinguish each transport stream within a single network (terrestrial, cable or satellite) from another, MPEG-2 established the use of a 16-bit (ranging from 0 to 65535) transport_stream_identifier, which is also called a TSID.)

A num_channels_in_section field indicates the number of virtual channel definitions. (The num_channels_in_section field in ATSC Cable Virtual Channel table (CVCT) table section is an eight-bit field that indicates the number of virtual channel definitions to follow in the table section.)

A short_name field is a 112-bit field indicating the short name for the virtual channel. (The short_name field is a 112-bit field in ATSC CVCT table sections that gives the short_name for the virtual channel. Each letter of the short_name is formatted as a 16-bit Unicode character, with the high order byte transmitted first. Therefore, short_name for TVCT and CVCT entries is seven Unicode characters, which short_name for SVCT entries is eight Unicode characters. If the display name is less than the number of permitted characters, 0/0x00 is appended to the end until the allotted number of bits has been reached.)

An ATSC channel number is represented by the channel numbers of two parts.

A major_channel_number field indicates the number of major channels associated with the virtual channel. (A 10-bit number that represents the "major" channel number associated with the virtual channel being defined in this iteration of the "for" loop. Each virtual channel shall be associated with a major and a minor channel number. The major channel number, along with the minor channel number, act as the user's reference number for the virtual channel. The major_channel_number shall be between 1 and 99. The value of major_channel_number shall be set such that in no case is a major_channel_number/minor_channel_number pair duplicated within the CVCT.)

A minor_channel_number field indicates the number of minor channels associated with the virtual channel. (A 10-bit number in the range 0 to 999 that represents the "minor" or "sub"—channel number. This field, together with major_channel_number, performs as a two-part channel number, where minor_channel_number represents the second or right-hand part of the number. When the service_type is analog television, minor_channel_number shall be set to 0.)

A modulation mode field indicates the modulation mode of the transport carrier of the virtual channel. (The modulation_mode is an eight-bit field in a virtual channel entry tells receivers the modulation used to transmit individual channels.)

A carrier_frequency field transmits carrier frequency information used by a transport virtual channel. (The carrier frequency is a 32-bit field that transmits the carrier frequency used by the transport carrying the virtual channel.)

A channel_TSID field indicates an MPEG-2 Transport Stream ID of a transport stream (TS) for transmitting an MPEG-2 program associated with the virtual channel. (The channel_TSID is a 16-bit unsigned integer field that gives the transport_stream_id of the channel that carries (or for inactive channels, will carry) the virtual channel.)

A program_number field identifies each program service or virtual channel within a TS (The program_number is a 16-bit unsigned integer that uniquely identifies each program service (or virtual channel) present in a transport stream.)

An ETM_location field indicates presence of an extended text message for a channel, event or data event. (The ETM_location field denotes whether there is an extended text message for the channel (Channel Extended Text table or CETT), event (Event Extended Text table) or data event (Data Extended Text table).)

An access_controlled field indicates whether the event associated with the virtual channel may be controlled. (When access_controlled is set to "1", this means that events associated with this virtual channel may be access controlled. When set to "0", access to the event is not controlled.)

A hidden field means whether the channel may be accessed by the direct entry (or field, attribute, entity) of the virtual channel number. (When hidden is set to "1", this means the channel cannot be accessed by direct entry of the virtual channel number. When set to "0", the virtual channel can be accessed by direct entry.)

A path_select field is a field of a CVCT which associates the virtual channel with a transmission path of an active channel. (The path_select is a 1-bit field in a Cable Virtual Channel table (CVCT) entry that associates a virtual channel with a transmission path of an active channel or when the channel will be active.)

An out_of_band field indicates whether the virtual channel is transmitted on an out-of-band (OOB) physical transmission channel. (The out_of_band is a 1-bit Boolean field in a Cable Virtual Channel table entry that when set to "1" is carries on the out-of-band physical transmission channel. When clear or "0", the virtual channel is carried within a tuned multiplex. When the channel is inactive, out_of_band reflects the channel that will be valid when the channel is again active.)

A hide_guide field means whether the channel may be accessed by the direct entry (or field, attribute, entity) of the virtual channel number (When hide_guide is set to "1", this means the channel cannot be accessed by direct entry of the virtual channel number. When set to "0", the virtual channel can be accessed by direct entry.)

A service_type field identifies a service type set in the virtual channel. (The service_type is a 6-bit enumerated field that identifies the type of service set in the virtual channel.) As one embodiment for a UHD service, a service type may be set to a parameterized service (0x07), an extended parameterized service (0x09) or a new DTV service (0x10). The above-described service names and values are exemplary and other names or values may be set.

A source_id field is a 16-bit unsigned integer indicating a programming source associated with the virtual channel. (A 16-bit unsigned integer number that identifies the programming source associated with the virtual channel. In this context, a source is one specific source of video, text, data or audio programming. Source ID value zero is reserved. Source ID values in the range 0x0001 to 0x0FFF shall be unique within the Transport Stream that carries the VCT, while 0x1000 to 0xFFFF shall be unique at the regional level. Values for source_ids 0x1000 and above shall be issued and administered by a Registration Authority designated by the ATSC.)

A descriptors_length field signals the length in bytes of the descriptor field to follow. (The descriptors_length is a 10-bit unsigned integer field that signals the length in bytes of the descriptor field to follow. If there are no descriptors present, zero would be appropriate.)

A descriptor is a descriptor loop located in the table. The descriptor loop may include additional descriptors. In the present invention, as one embodiment for a UHD service, the descriptor loop may include an ATSC_private_information_descriptor. In addition, the descriptor loop may further include an additional descriptor such as a UHD_descriptor.

FIG. 5 is a diagram illustrating signaling information for providing a UHD service via Clear QAM according to one embodiment of the present invention.

A transport_stream_id field is equal to the 16-bit MPEG-2 transport stream ID within a program association table (PAT) having a PID value of 0. A TVCT broadcast via another physical transport channel is distinguished by the transport_stream_id field.

A major_channel_number field is a 10-bit field that indicates the number of major channels associated with the virtual channel defined in the iteration of the loop. Each virtual channel shall be connected by major and minor channel numbers. Along with the minor channel number, the major channel number is used as a reference number of the user for the virtual channel. The major_channel_number has a value of 1 to 99.

A minor_channel_number field indicates the number of minor or sub channels and a service having a service_type of ATSC_digital_television uses a minor number of 1 to 99.

A modulation mode field indicates the modulation mode of the transport carrier of the virtual channel. A carrier_frequency field transmits carrier frequency information used by a transport virtual channel. A channel_TSID field indicates an MPEG-2 Transport Stream ID of a transport stream (TS) for transmitting an MPEG-2 program associated with the virtual channel.

A source_id field is a 16-bit field indicating the programming source connected to the virtual channel. Here, the source indicates one specific source such as video, text, data or audio programming. The source_id field has a unique value in a range of 0x1000 to 0x0FFF within the TS for transmitting the VCT.

A service_type field identifies a service type set in the virtual channel. (The service_type is a 6-bit enumerated field that identifies the type of service set in the virtual channel.) As one embodiment, the service_type field may be defined as one of a parameterized service (0x07), an extended parameterized service (0x09) or a new DTV service (0x10) in order to provide a UHD service. The above-described service names and values are exemplary and other names or values may be set.

As one embodiment, the descriptor loop may include a service_location_descriptor, an ATSC_private_information_descriptor and a UHD_descriptor. The service_location_descriptor may include type information of an element stream. The ATSC_private_information_descriptor may include information on channel encryption and transmission/non-transmission of the same broadcast. The UHD_descriptor may include information for UHD broadcast restoration. Each descriptor will be in detail below.

For example, if the ATSC_private_information_descriptor is present in the CVCT channel, the signal transmission device distinguishes among a UHD channel, an HD channel and an SD channel to prevent duplicate reception of the signal reception device. Accordingly, the signal transmission device signals a UHD channel using a channel mode and resolution field included in the ATSC_private_information_descriptor. In addition, the signal transmission device signals detailed information on 4 k UHD video using the descriptor included in the CVCT and the TVCT. For example, the detailed information on the UHD video may include information such as frame rate, aspect ratio, bit depth, chroma sampling, etc. Such detailed information may be signaled via a component list descriptor and a parameterized service descriptor in case of a parameterized service or an extended parameterized service. Alternatively, the detailed information may be signaled via a separate descriptor in case of a new DTV service.

As one embodiment, when the same content having different resolutions is simultaneously transmitted via one physical channel, a transport_stream_id meaning the physical channel may be the same and a source_id meaning the virtual channel may be different. Accordingly, the signal reception device checks channel_TSID, source_id, major_channel_number and minor_channel_number information.

As another example, even when the physical channel is different, the same content having different resolutions may be transmitted. Accordingly, for channel change, transport_stream_id, modulation_mode, carrier_frequency information, etc. may be further necessary in addition to channel_TSID, source_id, major_channel_number and minor_channel_number information. In addition, the UHD_descriptor may include information necessary to determine whether the signal reception device may receive the UHD service.

FIG. 6 is a diagram illustrating an example of signaling codec information according to one embodiment of the present invention.

A service_location_descriptor may be located next to a descriptors_length field. The service_location_may include the following information.

A descriptor_tag field may include an identifier for identifying this descriptor and a descriptor_length field indicates the length of the descriptor.

A PCR_PID field indicates an identifier for identifying a packet where a program clock reference (PCR) for a program service can be found. (The PCR_PID is the packet id where the program clock reference for a program service can be found.)

A number_elements field indicates the number of elements listed in the descriptor. (The number_element gives the number of elements listed in the descriptor.)

A stream_type field indicates which codec is used to compress video transmitted via the service (or channel). As one embodiment, if the stream_type is 0x1B, this means that the transmitted video data is compressed using AVC/H.264. If the stream_type is 0x24, this means that the transmitted video data is compressed using HEVC. The stream_type may be located at the service_location_descriptor of the CVCT.

An elementary_PID field indicates a packet ID specified within a PMT section for finding a specific elementary stream. (The elementary_PID is the packet id indicated in a PMT section to find a particular elementary stream.)

An ISO_639_language_code field is a field included in the service_location_descriptor in order to identify the language used in the elementary stream. (The ISO_639_language_code is a 24-bit three ASCII character field in an ATSC Service location descriptor that conforms to ISO 639.2/B and specifies the language used for the elementary stream.)

FIG. 7 is a diagram illustrating detailed signaling information for providing a UHD service according to one embodiment of the present invention.

FIG. 7 shows one embodiment of the bit stream syntax of a descriptor for a clear QAM DTV in order to indicate the total channel frequency organization version of a cable broadcast provider, whether the channel is encrypted and whether the channel is a VOD channel, image resolution and transmission/non-transmission of the same broadcast. This descriptor is present in a descriptor loop present in the CVCT of every channel.

A descriptor_tag field is an 8-bit field that indicates ATSC_private_information_descriptor and has a value of 0xAD.

A descriptor_length field is an 8-bit field indicating the length in bytes of the descriptor from the descriptor_length field to the end of this descriptor and has a value of 0x09.

A format_identifier field uses a 32-bit field that uses a value registered in an SMPTE for use of the ATSC_private_information_descriptor and has a value of 0x54544130.

A private_info_count field is an 8-bit field that indicates a loop count within the private_info_loop and has a value of 0x01.

A private_info_type field is an 8-bit field that indicates a descriptor for Clear QAM DTV using the ATSC_private_information_descriptor and has a value of 0x02.

A private_info_length field is an 8-bit field that indicates the length in bytes of each field from the private_info_length field to the end of the private_info_loop.

A ch_frequency_version_number field indicates the total frequency organization version of the cable broadcast provider and is represented by the remainder when this value is incremented by 1 and then is divided by 256 if the frequency organization of the cable broadcast provider is changed. The same value shall be described in the descriptor for the clear QAM DTV in the CVCT of every channel. If the value of this field is changed, the receive device may notify the user that the broadcast channel frequency organization has been changed and enable the user to perform channel search.

A channel_mode field indicates whether the channel is encrypted and whether the channel is a VOD channel. The clear QAM reception device enables the user to view only the unencrypted channel. If the value of this field conflicts with the meaning of the access_controlled value of the CVCT, the value of this field is preferentially applied. Preferentially applying the value of this field is meaningful only when the hidden field of the CVCT is not "1".

For example, the channel_mode field of the UHD broadcast service may be assigned the following values.

If the channel_mode field is 0, this means an unencrypted (clear) channel and the reception device processes the channel.

If the channel_mode field is 1, this means an encrypted (scrambling) channel and the reception device ignores the channel.

If the channel_mode field is 2, this means a VOD channel and the reception device ignores the channel.

A resolution field indicates the image resolution of the channel and transmission/non-transmission of the same broadcast and the reception device may perform appropriate processing, that is, may not repeatedly provide the same broadcast channel to the user according to the field value for user convenience. The reception device includes a channel configuration only with respect to a channel having processable image resolution and does not include a channel configuration with respect to the other field values.

The resolution field includes resolution information of this channel and information indicating whether a channel having the same resolution as this channel is present. That is, whether the channel is an SD channel, an HD channel or a UHD channel may be identified according to the value of the resolution field and whether a channel duplicating each channel is present may be identified.

As one embodiment, the resolution field may be assigned the following values.

If the resolution field is 1, this means an SD channel without a duplicate channel. If the resolution field is 2, this means an SD channel with a duplicate HD channel. If the resolution field is 3, this means an SD channel with a duplicate UHD channel.

If the resolution field is 4, this means an HD channel without a duplicate channel. If the resolution field is 5, this means an HD channel with a duplicate SD channel. If the resolution field is 6, this means an HD channel with a duplicate UHD channel.

If the resolution field is 7, this means a UHD channel without a duplicate channel. If the resolution field is 8, this means a UHD channel with a duplicate SD channel. If the resolution field is 9, this means a UHD channel with a duplicate HD channel.

Clear QAM enables the user to view only an unencrypted channel in which a channel_mode field in the ATSC_private_information_descriptor is 0.

For example, if the resolution value is 3 or 6 (the current channel is not a UHD channel but a duplicate UHD channel is present), the current channel may be changed to a UHD channel using a combination of CVCT field values (e.g., channel_TSID, source_id, major_channel_number, minor_channel_number, modulation_mode, carrier-frequency, etc.) and a UHD_linkage_descriptor. In addition, if the resolution value is 7, 8 or 9, detailed information on UHD video may be provided via the UHD_descriptor in order to provide identification information of the UHD channel.

FIG. 8 is a diagram illustrating signaling information for providing a UHD channel according to one embodiment of the present invention.

If the resolution field corresponds to a UHD channel (resolution is in a range of 7 to 9), the reception device may determine whether the UHD channel may be received using the UHD_descriptor to perform the UHD service.

In order to perform such a function, the UHD_descriptor may include the following information.

A descriptor_tag field may include an identifier for identifying this descriptor and a descriptor_length field indicates the length of the descriptor. A UHD_descriptor includes a UHD_metadata field. The UHD_metadata field may include the following information.

A UHD_video_codec_type field indicates the codec of a video element configuring a UHD service. This field has the same value as the stream_type field of the PMT. The stream_type field of the PMT indicates information such as MPEG-2, H.264/AVC or HEVC.

A UHD_video_profile field indicates the profile of the video stream, that is, the basic specifications necessary to decode the stream. The UHD_video_profile field includes the chroma subsampling (e.g., 4:2:0, 4:2:2, etc.) of the video stream, bit depth (e.g., 8 bits, 10 bits), requirement information of a coding tool, etc.

A UHD_video_level field defines the level of the video stream, that is, the supported range of the description element defined in the profile and includes resolution, frame rate, bit rate information, etc.

A UHD_video_resolution field signals information on a UHD video format and indicates the resolution of video (e.g., 3840x2160, 4096x2160, 7680x4320, etc.).

A UHD_video_framerate field indicates frame rate information of UHD video (e.g., 30 fps, 60 fps, 120 fps, etc.).

A UHD_video_bitdepth field indicates bit depth information of UHD video (e.g., 8 bits, 10 bits, 12 bits, etc.).

A UHD_vide_chroma_sampling field indicates UHD video chroma sampling information (e.g., 4:2:0, 4:2:2, 4:4:4, etc.).

A UHD_video_aspectratio field indicates UHD video aspect ratio information (e.g., 16:9, 21:9, etc.).

A UHD_video_tier field is linked with the level to indicate maximum bit rate information of a video stream. A tier is to provide a maximum bit rate higher than an existing maximum bit rate. A tier may be divided into a main tier and a high tier. That is, the tier may divide the level-based max bit rate according to usage thereof when a higher-quality image is required.

A specified category of level constraints imposed on values of the syntax elements in the bitstream, where the level constraints are nested within a tier and a decoder conforming to a certain tier and level would be capable of decoding all bitstreams that conform to the same tier or the lower tier of that level or any level.

In this manner, the reception device may receive the UHD channel using descriptor information included in the CVCT and perform the UHD service.

FIG. 9 is a diagram illustrating signaling information for providing a UHD service via Clear QAM according to another embodiment of the present invention. That is, if the ATSC private information descriptor is not included in the CVCT, the UHD service may be signaled using a terrestrial virtual channel table (TVCT).

A table_id field identifies the table. Since the table shown in FIG. 9 is a TVCT, the value of the table_id is 0x08.

A section_syntax_indicator field is a 1-bit field set to 1 in order to indicate the long form of the MPEG-2 private_section table. (This 1-bit field shall be set to "1" to always indicate the "long" form of the MPEG-2 private_section table.)

A private_indicator field is a 1-bit field set to 1 (This 1-bit field shall be set to "1".)

A section_length field indicates the length in bytes of a table section following this field. (This is a 12-bit field, the first two bits of which shall be "00". It specifies the number of bytes of the section, starting immediately following the section_length field and including the CRC. The section_length shall not exceed 1021 so that the entire section has a maximum length of 1024 bytes.)

A transport_stream_id field indicates the identifier of the MPEG-2 transport stream (TS) in the table. (To distinguish each transport stream within a single network (terrestrial, cable, or satellite) from another, MPEG-2 established the use of a 16-bit (ranging from 0 to 65535) transport_stream_identifier, which is also called a TSID.)

A version_number field is a 5-bit field indicating the version number of the table. (This 5-bit field is the version number of the PSIP_section. The version_number shall be incremented by 1 modulo 32 when a change in the information carried within the PSIP_section occurs. When the current_next_indicator is set to "0", then the version_number shall be that of the next applicable PSIP_section with the same table_id, table_id_extension, and section_number.)

A current_next_indicator field is a 1-bit field, which indicates whether this table is currently or next applicable. (A 1-bit field, which when set to "1" indicates that the PSIP_section sent is currently applicable. When the current_next_indicator is set to "1", then the version_number shall be that of the currently applicable PSIP_section. When the bit is set to "0", it indicates that the PSIP_section sent is not yet applicable and shall be the next PSIP_section with the same section_number, table_id_extension, and table_id to become valid.)

A section_number field indicates the number of the section. (This 8-bit field gives the number of the PSIP_section. The section_number of the first section in a PSIP table shall be 0x00. The section_number shall be incremented by 1 with each additional section in the PSIP table. The scope of the section_number shall be defined by the table_id and table_id_extension. That is, for each PSIP table and value of the table_id_extension field, there is the potential for the full range of section_number values.)

A last_section_number field identifies the number of the last section. (This 8-bit field specifies the number of the last section (that is, the section with the highest section_number) of the PSIP table of which this section is a part. Its scope is the same as that of the section_number field.)

A protocol_version field has a function for allowing, in the future, a current table type to carry parameters different from parameters defined in the current protocol (An 8-bit unsigned integer field whose function is to allow, in the future, this table type to carry parameters that may be structured differently than those defined in the current protocol. At present, the only valid value for protocol_version is zero. Non-zero values of protocol_version may be used by a future version of this standard to indicate structurally different tables.)

A num_channels_in_section field indicates the number of virtual channel definitions. (The num_channels_in_section field in ATSC Cable Virtual Channel table (CVCT) table section is an eight-bit field that indicates the number of virtual channel definitions to follow in the table section.)

A short_name field is a 112-bit field indicating the short name for the virtual channel. (The short_name field is a 112-bit field in ATSC CVCT table sections that gives the short_name for the virtual channel. Each letter of the short_name is formatted as a 16-bit Unicode character, with the high order byte transmitted first. Therefore, short_name for TVCT and CVCT entries is seven Unicode characters, which short_name for SVCT entries is eight Unicode characters. If the display name is less than the number of permitted characters, 0/0x00 is appended to the end until the allotted number of bits has been reached.)

An ATSC channel number is represented by the channel numbers of two parts.

A major_channel_number field indicates the number of major channels associated with the virtual channel. (A 10-bit number that represents the "major" channel number associated with the virtual channel being defined in this iteration of the "for" loop. Each virtual channel shall be associated with a major and a minor channel number. The major channel number, along with the minor channel number, act as the user's reference number for the virtual channel. The major_channel_number shall be between 1 and 99. The value of major_channel_number shall be set such that in no case is a major_channel_number/minor_channel_number pair duplicated within the CVCT.)

A minor_channel_number field indicates the number of minor channels associated with the virtual channel. (A 10-bit number in the range 0 to 999 that represents the "minor" or "sub"—channel number. This field, together with major_channel_number, serves as a two-part channel number, where minor_channel_number represents the second or right-hand part of the number. When the service_type is analog television, minor_channel_number shall be set to 0.)

A modulation mode field indicates the modulation mode of the transport carrier of the virtual channel. (The modulation_mode is an eight-bit field in a virtual channel entry tells receivers the modulation used to transmit individual channels.)

A carrier_frequency field transmits carrier frequency information used by a transport virtual channel. (The carrier frequency is a 32-bit field that transmits the carrier frequency used by the transport stream carrying the virtual channel.)

A channel_TSID field indicates an MPEG-2 Transport Stream ID of a transport stream (TS) for transmitting an MPEG-2 program associated with the virtual channel. (The channel_TSID is a 16-bit unsigned integer field that gives the transport_stream_id of the channel that carries (or for inactive channels, will carry) the virtual channel.)

A program_number field identifies each program service or virtual channel within a TS. (The program_number is a 16-bit unsigned integer that uniquely identifies each program service (or virtual channel) present in a transport stream.)

An ETM_location field indicates presence of an extended text message for a channel, event or data event. (The ETM_location field denotes whether there is an extended text message for the channel (Channel Extended Text table or CETT), event (Event Extended Text table) or data event (Data Extended Text table).)

An access_controlled field indicates whether the event associated with the virtual channel may be controlled. (When access_controlled is set to "1", means that events associated with this virtual channel may be access controlled. When set to "0", access to event is not controlled.)

A hidden field indicates whether the channel may be accessed by the direct entry (or field, attribute, entity) of the virtual channel number. (When hidden is set to "1", this means the channel cannot be accessed by direct entry of the virtual channel number. When set to "0", the virtual channel can be accessed by direct entry.)

A high_guide field indicates whether the channel may be accessed by the direct entry (or field, attribute, entity) of the virtual channel number (When hide_guide is set to "1", this means the channel cannot be accessed by direct entry of the virtual channel number. When set to "0", the virtual channel can be accessed by direct entry.)

A service_type field identifies a service type set in the virtual channel. (The service_type is a 6-bit enumerated field that identifies the type of service set in the virtual channel.) As one embodiment of a UHD service, a service type may be set to a parameterized service (0x07), an extended parameterized service (0x09) or a new DTV service (0x10). The above-described service names and values are exemplary and other names or values may be set.

A source_id field is a 16-bit unsigned integer indicating a programming source associated with the virtual channel. (A 16-bit unsigned integer number that identifies the programming source associated with the virtual channel. In this context, a source is one specific source of video, text, data or audio programming. Source ID value zero is reserved. Source ID values in the range 0x0001 to 0x0FFF shall be unique within the Transport Stream that carries the VCT, while 0x1000 to 0xFFFF shall be unique at the regional level. Values for source_ids 0x1000 and above shall be issued and administered by a Registration Authority designated by the ATSC.)

A descriptors_length field signals the length in bytes of the descriptor field to follow. (The descriptors_length is a 10-bit unsigned integer field that signals the length in bytes of the descriptor field to follow. If there are no descriptors present, zero is appropriate.)

A descriptor is a descriptor loop located in the table. The descriptor loop may include additional descriptors. Detailed identification information of the UHD service included in the descriptor will be described below.

An additional_descriptors_length field indicates the length in bytes of the descriptor field to follow. (The additional_descriptors_length is a 10-bit field that signals the length in bytes of the descriptor field to follow. If there are no descriptors present, zero is appropriate.)

An additional_descriptor may define an additional descriptor.

For example, if the ATSC_private_information_descriptor is not included in the CVCT, the transmission device signals signaling information using the TVCT such that the UHD channel version of the HD channel or the SD channel is prevented from being received. That is, the transmission device separately signals information on the UHD channel using the TVCT and signals information on the UHD service via the channel using the service_type field included in at least one of the CVCT and the TVCT. In addition, detailed information of UHD video is signaled using the descriptor included in at least one of the CVCT and the TVCT.

FIG. 10 is a diagram illustrating an embodiment of descriptor information according to a service of the present invention.

As one embodiment, when the transmission device transmits a UHD video signal, the service_type may be set to one of 0x07, 0x09 or 0x10. If the service_type is set to 0x07, the TVCT may include a component list descriptor, a service location descriptor and a UHD descriptor. If the service_type is set to 0x09, the TVCT may include a component list descriptor, a parameterized service descriptor and a service location descriptor. If the service_type is set to 0x10, the TVCT may include a UHD descriptor and a service location descriptor.

When the transmission device transmits a signal (non-UHD) other than the UHD video signal, the service_type may be set to one of 0x02, 0x07 or 0x09. If the service_type is set to 0x02, the TVCT may include a service location descriptor and a UHD linkage descriptor. If the service_type is set to 0x07, the TVCT may include a component list descriptor, a service location descriptor and a UHD linkage descriptor. If the service_type is set to 0x09, the TVCT may include a component list descriptor, a parameterized service descriptor, a service location descriptor and a UHD linkage descriptor. Detailed information included in the descriptor will be described below.

Figure 11:
FIG. 11 is a diagram showing duplicate channel signaling information according to one embodiment of the present invention.

FIG. 11 is a diagram showing duplicate channel signaling information according to one embodiment of the present invention.

As described above, when the transmission device transmits a signal (non-UHD) other than the UHD video signal, channel change and signaling information thereof are necessary for the reception device to receive the UHD video signal. Accordingly, a UHD_linkage_descriptor is included in signaling information associated with an SD or HD channel and presence and detailed information of a UHD channel corresponding to the SD or HD channel may be signaled. That is, a TVCT, CVCT or EIT transmitted via the SD or HD channel may signal UHD channel or event information corresponding to the channel.

As one embodiment, the UHD_linkage_descriptor may include the following information.

A descriptor_tag may include an identifier for identifying this descriptor and a descriptor_length indicates the length of the descriptor.

A UHD_version_exist_flag indicates whether a UHD channel or event corresponding to the current channel or event is provided.

UHD_linkage_info may be located next to the UHD_version_exist_flag. The UHD_linkage_info may include the following information.

A UHD_in_other_mux_flag indicates whether a UHD channel or event corresponding to the current channel is transmitted via another TS (or another physical cannel).

A UHD_service_type indicates the type of the UHD service. The UHD_service_type provides information capable of determining whether the reception device may decode the linked channel, which may be set to 4 k 30 Hz if the value thereof is 0x01, 4 k 60 Hz if the value thereof is 0x02, or 8 k 60 Hz if the value thereof is 0x03.

A UHD_transport_stream_id indicates the transports_stream_id of the PAT for the UHD channel and distinguishes a physical transmission channel.

A UHD_modulation_mode indicates the modulation mode of the UHD channel and indicates information such as ATSC 8-VSB, 64-QAM, 256-QAM, etc.

A UHD_carrier_frequency indicates the carrier frequency of the UHD channel and means the actual frequency of the physical transmission channel.

A UHD_channel_TSID indicates the TS ID of a program configuring the UHD channel corresponding to the current channel. That is, this indicates the ID of the MPEG-2 TS on which the elementary stream configuring the corresponding UHD channel is transmitted.

A UHD_source_id indicates the source id of the UHD channel corresponding to the current channel.

A UHD_major_channel_number and a UHD_minor_channel_number indicate the major channel number and the minor channel number of the UHD channel corresponding to the current channel, respectively.

FIG. 12 is a diagram illustrating signaling information for providing a UHD service according to another embodiment of the present invention.

Whether the UHD service is provided via the ATSC virtual channel may be signaled using the following two methods.

As one method, a method of setting a service_type to 0x07 and signaling information on a UHD video service using a component list descriptor is used.

In this case, this is a method of signaling information on a video service using HEVC, rather than a method of signaling information on a service specialized for UHD, and 4 k or 8 k may be confirmed using information included in a stream_info_detail descriptor.

As a second method, a method of setting a service_type to 0x09 and signaling information on a UHD video service using a component list descriptor is used. At this time, the service_type may be set to an extended parameterized service (service_type=0x09). In this case, information on the UHD service may be described in greater detail. That is, even when the same HEVC is used, the second method is a service specialized for UHD. In this case, detailed information shall be included using a parameterized service descriptor.

A component_list_descriptor may include the following information.

A descriptor_tag field may include an identifier for identifying this descriptor and a descriptor_length field indicates the length of the descriptor.

If an alternate field is set to 1, this means that the instance of the component list descriptor is secondary and, if the alternate field is set to 0, this means that the instance of the descriptor is primary. (A flag that indicates, when set to "1", that this instance of the component_list_descriptor( ) is a second, "alternate" description of streams associated with the virtual channel. When the flag is set to "0", the set of stream types in the instance of the descriptor is the "primary" or "preferred" set. If only one component_list_descriptor( ) appears in the descriptor loop, the value of the alternate flag shall be set to "0".)

A component_count field specifies the number of components specified in the loop to follow. (This 7-bit unsigned integer shall specify the number of components specified in the "for" loop to follow. The value shall be in the range of 1 to 36.)

A stream_type field indicates a stream type associated with the component described in this iteration of the loop. (This 8-bit unsigned integer field shall indicate the stream_type associated with the component described in this iteration of the "for" loop. Streams types in the range 0xC4 to 0xFF identify privately defined stream types.) As one embodiment, in case of HEVC, the stream_type may be set to 0x24.

A format_identifier field identifies an entity providing the stream_type value. (This 32-bit unsigned integer shall identify the entity providing the stream_type value.)

A length_of_details field specifies the defined length of the stream_info_details field to follow. (This 8-bit unsigned integer shall specify the length, in bytes, of the defined length of the stream_info_details( ) field to follow.)

A stream_info_details field provides additional further information pertaining to the component identified by the value in the preceding stream_type field. (This field shall provide further information pertaining to the component identified by the value in the preceding stream_type field.) The stream_info_details field may include the following information.

A profile means the profile value of an HEVC codec and may have a value of Main Profile or Main 10 Profile.

A tier is used together with a level and is used to restrict a maximum bit rate. In general, in case of broadcast, a main tier may be designated.

The level may be set to Level 5.0 in case of 3840×2160 and 30 Hz and may be set to Level 5.1 in the case of 3840×2160 and 60 Hz.

FIG. 13 is a diagram illustrating other signaling information for providing a UHD service according to another embodiment of the present invention. As described above, the service_type may be set to an extended parameterized service (service_type-0x09). In this case, a parameterized service descriptor is also used to include detailed information. The parameterized service descriptor may include the following information.

A descriptor_tag may include an identifier for identifying the current descriptor and a descriptor_length indicates the length of the descriptor.

An application_tag identifies an application associated with the syntax or semantics of application_data to follow. (This 8-bit unsigned integer shall uniquely identify the application associated with the syntax and semantics of the application_data to follow.). As one embodiment, if the application_tag value is 0x02, this may indicate a UHD service.

The application_data is set according to the associated application_tag value. (The syntax and semantics of this field shall be as specified in the standard that establishes the associated application_tag value.) As one embodiment, if the application_tag value is 0x02, a UHD metadata field may be included. The UHD_metadata field is equal to that described with reference to FIG. 8. That is, the UHD_metadata field may include UHD_video_codec_type, UHD_video_profile, UHD_video_level, UHD_video_resolution, UHD_video_framerate, UHD_video_bitdepth, UHD_video_chroma_sampling, UHD_video_aspectratio and UHD_video_tier information.

FIG. 14 is a diagram showing duplicate channel signaling information according to another embodiment of the present invention.

In the present invention, a duplicate channel may be signaled via a direct channel change table (DCCT) and the current channel may be automatically changed to a UHD channel according to the configuration of the DCCT. The DCCT may be set to automatically change the channel if a specific condition is satisfied and may include a DCC request term including a dcc_selection_type and a dcc_selection_id field. In one embodiment of the present invention, detailed information of a UHD service may be included in signaling information of the dcc_selection_type and the dcc_selection_id to automatically change the current channel to a UHD service channel. In a duplicate channel signaling method of another embodiment, UHD service channel information may be included in the dcc_subtype to signal information related to automatic channel change such that the reception device performs a UHD service.

The information included in the DCCT will now be described.

A table_id field indicates a table type. Since the table shown in FIG. 14 is a DCCT, a table_id has a value of 0xD3.

A section_syntax_indicator field is a 1-bit field set to 1 to indicate the long form of the MPEG-2 private_section table.

(This 1-bit field shall be set to "1" to always indicate the "long" form of the MPEG-2 private_section table.)

A private_indicator field is a 1-bit field set to 1. (This 1-bit field shall be set to "1".)

A section_length field indicates the length, in bytes, of a table section following this field. (This is a 12-bit field, the first two bits of which shall be "00". It specifies the number of bytes of the section, starting immediately following the section_length field and including the CRC. The section_length shall not exceed 1021 so that the entire section has a maximum length of 1024 bytes.)

A dcc_subtype field is an 8-bit field that indicates the type of direct channel change (DCC). As one embodiment, the DCC type of the UHD service may be defined as 0x01. That is, in the present invention, if the dcc_subtype field is 0x01, the channel is automatically changed to the UHD channel such that the UHD service is possible.

A dcc_id field is used to create the master guide table entry for the table section. (The dcc_id is an 8-bit unsigned integer field (starting at bit index 32) in a Directed Channel Change Selection Code table section and is used in creating the Master Guide table entry for the table section.)

A version_number field is a 5-bit field indicating the version number of the table. (This 5-bit field is the version number of the PSIP_section. The version_number shall be incremented by 1 modulo 32 when a change in the information carried within the PSIP_section occurs. When the current_next_indicator is set to "0", then the version_number shall be that of the next applicable PSIP_section with the same table_id, table_id_extension, and section_number.)

A current_next_indicator field is a 1-bit field, which indicates whether this table is currently or next applicable. (A 1-bit field, which when set to "1" indicates that the PSIP_section sent is currently applicable. When the current_next_indicator is set to "1", then the version_number shall be that of the currently applicable PSIP_section. When the bit is set to "0", it indicates that the PSIP_section sent is not yet applicable and shall be the next PSIP_section with the same section_number, table_id_extension, and table_id to become valid.)

A section_number field indicates the number of the section. (This 8-bit field gives the number of the PSIP_section. The section_number of the first section in a PSIP table shall be 0x00. The section_number shall be incremented by 1 with each additional section in PSIP table. The scope of the section_number shall be defined by the table_id and table_id_extension. That is, for each PSIP table and value of the table_id_extension field, there is the potential for the full range of section_number values.)

A last_section_number field identifies the number of the last section. (This 8-bit field specifies the number of the last section (that is, the section with the highest section_number) of the PSIP table of which this section is a part. Its scope is the same as that of the section_number field.)

A protocol_version field has a function for allowing, in the future, a current table type to carry parameters different from parameters defined in the current protocol. (An 8-bit unsigned integer field whose function is to allow, in the future, this table type to carry parameters that may be structured differently than those defined in the current protocol. At present, the only valid value for protocol_version is zero. Non-zero values of protocol_version may be used by a future version of this standard to indicate structurally different tables.)

A dcc_text_count field indicates the number of DCCs in a DCC section. (The dcc_text_count is the number of Directed Channel Changes in a DCCT section.)

A dcc_context field indicates that the reception device acquires information on a channel, to which the channel is changed, until a specific condition is satisfied if this field is set to 0 and the reception device tunes to a channel, to which the channel is changed, if this field is set to 1. (0x0 (Temporary Retune)—Acquire the "to channel" and until user changes channel, end time is reached, or DCC is cancelled by a Return to Original Channel. Original Channel number/"from" channel number No, except to signal return to original channel, 0x1 (Channel Redirect)—Tune to the "to channel".)

A dcc_from_major_channel_number field indicates the number of major channels associated with the starting point of the DCC test. (The dcc_from_major_channel_number is a 10-bit field that gives highest order digits of the channel number from which a Directed Channel Change test applies.)

A dcc_from_minor_channel_number field indicates the number of minor channels associated with the starting point of the DCC test. (The dcc_from_minor_channel_number is a 10-bit "minor_channel_number" field that gives low order bits of the channel number from which the Directed Channel Change test applies.)

A dcc_to_major_channel_number field indicates the number of major channels associated with the destination of the DCC test. (The dcc_to_major_channel_number is a 10-bit field that gives highest order digits of the channel number which is the destination of a Directed Channel Change test.)

A doc_to_minor_channel_number field indicates the number of minor channels associated with the destination of the DCC test. (The dcc_to_minor_channel_number is a 10-bit field that gives lowest order digits of the channel number which is the destination of a Directed Channel Change test.)

A dcc_start_time field indicates the nominal start time of the DCC test, expressed as a system time. (The dcc_start_time is a 32-bit unsigned integer field with the nominal start time of the DCC test, expressed as system_time.)

A dcc_end_time field indicates the end time of the DCC test, expressed as a system time. (The dcc_end_time is a 32-bit unsigned integer field that carries the time at which, if not previously cancelled, the DCC test will end, expressed as system_time.)

A dcc_term_count field indicates the number of terms in the DCC test. (The dcc_term_count is an 8-bit field with the number of terms in the Directed Channel Change test.)

A dcc_selection_type indicates a type including a dcc_selection_id. The dcc_selection_type may assign a UHD service as one piece of allocation information. As one embodiment, the UHD service may be assigned 0x24.

A dcc_selection_id field includes data distinguished by the dcc_selection_type. In the UHD service category, the dcc_selection_id may include UHD related information. As one embodiment, the dcc_selection_id may include information, such as resolution, frame rate, bit-depth, aspect ratio, etc., indicating the UHD service range.

A dcc_term_descriptors_length field indicates the length of the descriptor loop in the following field. (The dcc_term_descriptors_length is a 10-bit unsigned integer field signalling the length of the descriptor loop in the following field.)

A dcc_term_descriptor may include an additional descriptor.

A dcc_test_descriptors_length field indicates the length of the descriptor loop in the next field for dcc test. (The dcc_test_descriptors_length is a 10-bit unsigned integer field carrying the length of the descriptor loop in the next field for this dcc test.)

A dcc_test_descriptor may include an additional descriptor.

FIG. 15 is a diagram showing one piece of signaling information for change to a UHD channel according to another embodiment of the present invention. FIG. 15 shows the assigned information of the dcc selection type described with reference to FIG. 14.

For example, if the dcc_selection_type is 0x00, this indicates unconditional channel change. If the dcc_selection_type is 0x20 to 0x23, this indicates viewer direct select. As one embodiment, the value 0x24 of the dcc_selection_type may indicate direct channel change (dcc) to the UHD channel.

FIG. 16 is a diagram showing detailed signaling information for change to a UHD channel according to another embodiment of the present invention. FIG. 16 shows an example of a dcc_selection_id configuration in which the dcc_selection_type is assigned to a UHD service (e.g., 0x24).

If the dcc_selection_type is set to a UHD service, the dcc_selection_id may be composed of a total of 64 bits as shown in FIG. 16. The description defined in the UHD_code is equal to the description of the UHD_metadata described with reference to FIG. 8. Since the reception device may include a lower type, the dcc_selection_id is expressed in the form of a mask bit. That is, in the dcc_selection_id, the mode is set according to bit. If the bit is 1, the mode is supported and, if the bit is 0, the mode is not supported. Accordingly, this bit is different from the bit assigned in the UHD_metadata.

A UHD_video_bitdepth may be, for example, represented by 00001 (only 8 bits), 00010 (only 10 bits), 00100 (only 12 bits), 01000 (only 14 bits) or 10000 (only 16 bits) and the UHD_video_bitdepth of 00111 (8, 10, 12 bits) may be signaled for the reception device capable of receiving 8 bits, 10 bits and 12 bits. The other fields may be similarly signaled.

Figures 17, 18:
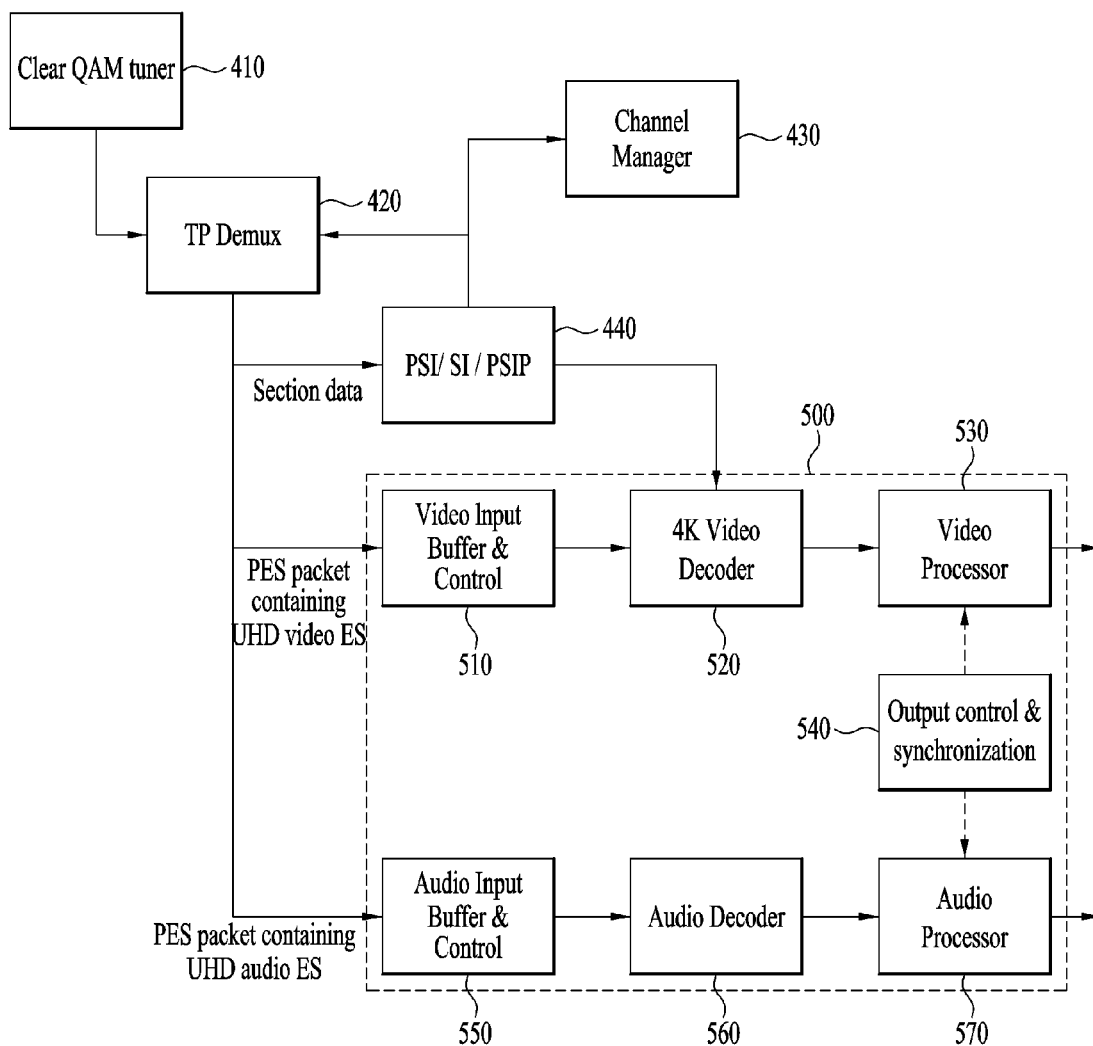
FIG. 17 is a diagram illustrating an example of signaling additional information for change to a UHD channel according to another embodiment of the present invention.
FIG. 18 is a diagram illustrating a signal reception device according to one embodiment of the present invention.

FIG. 17 is a diagram illustrating an example of signaling additional information for change to a UHD channel according to another embodiment of the present invention.

If a dcc_selection_type is set to a UHD service, a dcc_test_descriptor may signal additional information for automatic channel change. UHD_linkage_info may be equal to the UHD_linkage_info of the UHD_linkage_descriptor described with reference to FIG. 11. That is, the major_channel_number and the minor_channel_number of the information included in the UHD_linkage_info of the UHD_linkage_descriptor may not be included and may be defined in the DCCT.

FIG. 18 is a diagram illustrating a signal reception device according to one embodiment of the present invention.

The signal reception device according to the present invention includes a clear QAM tuner 410, a demux 420, a signaling information decoder 440 and a resource decoder 500 and may optionally include a channel manager 430.

The clear QAM tuner 410 receives an unencrypted digital cable channel stream.

The demux 420 may demultiplex a broadcast stream into signaling information, a video stream and an audio stream.

The signaling information decoder 440 may decode signaling information such as section data.

The resource decoder 500 may include a video buffer 510, a video decoder 520, a video processor 530, a synchronization unit 540, an audio buffer 550, an audio decoder 560 and an audio processor 570.

The embodiment in which the signaling information decoder 440 identifies a UHD service will now be described.

First, in a first embodiment, the UHD service may be identified using a CVCT.

The signaling information decoder 440 may identify that the UHD service is provided using the ATSC_private_information_descriptor in the CVCT. If a UHD_descriptor is present, the codec type, resolution, chroma sampling, and bit depth information of video included in order to provide the UHD service may be identified.

The signaling information decoder 400 may determine whether the signal reception device according to one embodiment of the present invention or the resource decoder 500 may decode the video stream or audio stream provided by the UHD service using the information included in the UHD_descriptor, when the information included in the UHD_descriptor is decoded.

The signaling information decoder 440 may obtain a PID value for acquiring a video stream and an audio stream included in the service from a PMT. The PID stream may be sent to and decoded by the video and audio decoder using the PID value identified in the PMT.

According to a second embodiment, the UHD service may be identified using a TVCT. If the ATSC_private_information_descriptor is not included in the CVCT, the TVCT may be received to identify the UHD service.

The signaling information decoder 440 identifies information on an event for providing a UHD broadcast service using a service type and a descriptor included in the TVCT. If a UHD service is received, video specification information and audio specification information for identifying each event included in a component_list_descriptor, a UHD_descriptor and a parameterized_service_descriptor is identified according to a service type value. The signaling information decoder 440 may identify whether the signal reception device according to one embodiment of the present invention or the resource decoder 500 may decode the event based on the identified video specification information and audio specification information.

According to a third embodiment, the UHD service may be identified using a UHD_linkage_descriptor. If the signal reception device receives an SD or HD service, the signaling information decoder 440 may identify presence and detailed information of the corresponding UHD channel using the UHD_linkage_descriptor included in the received SD or HD channel.

That is, the signaling information decoder 440 may identify a UHD broadcast event or service linked with an SD or HD event, when the service_type field value in the linkage descriptor is 0x02, 0x07 or 0x09. The signaling information decoder 440 may decode UHD_linkage_info( ) capable of identifying the linked UHD broadcast event or service.

According to a fourth embodiment, the UHD service is identified using a DCCT and change to the UHD channel may be automatically performed.

The signaling information decoder 440 recognizes information on a UHD event set in a dcc_subtype or dcc_selection_type and decodes information included in a dcc_selection_id and UHD_linkage_info associated therewith. In this case, the reception device may automatically change to the identified UHD channel to perform the UHD service.

The resource decoder 500 may include a video buffer 510, a video decoder 520, a video processor 530, a synchronization unit 540, an audio buffer 550, an audio decoder 560 and an audio processor 570.

The demux 420 inputs the demultiplexed video stream to the video buffer 510. The video stream may become a PES packet including a UHD video elementary stream. The video buffer 510 may temporarily store the video data of the input video stream.

The video decoder 520 may receive the video data stored by the video buffer 510 in a predetermined unit and perform video decoding. For example, although the decoder for decoding 4 k video data is described in this example, 8 k or 16 k video data may also be output.

For example, the video decoder 520 may decode the video data according to the characteristics of the video data based on the decoded signaling information.

The video processor 530 may perform post-processing with respect to the decoded signaling information. Thus, the decoded video data may be naturally displayed.

The audio stream demultiplexed by the demux 420 may be input to the audio buffer 550. Here, the audio stream may become a PES packet including a UHD audio elementary stream. The audio buffer 510 may temporarily store the received audio data.

The audio decoder 560 may receive the audio data stored by the audio buffer 510 in a predetermined unit to perform audio decoding and the audio processor 570 may perform post-processing with respect to the decoded audio data.

The synchronization unit 540 may synchronize two types of decoded data such that data output by the video processor 530 and the audio processor 570 is output on the same screen.

The channel manager 430 may control information necessary for channel change based on the signaling information decoded by the signaling information decoder 440. For example, when the user transmits a channel change signal, the channel manager may receive the channel change signal and control channel change. Alternatively, the channel manager 430 may determine whether a specific channel may be received or create a channel list using signaling information and perform operation related to the channel.

Figure 19:
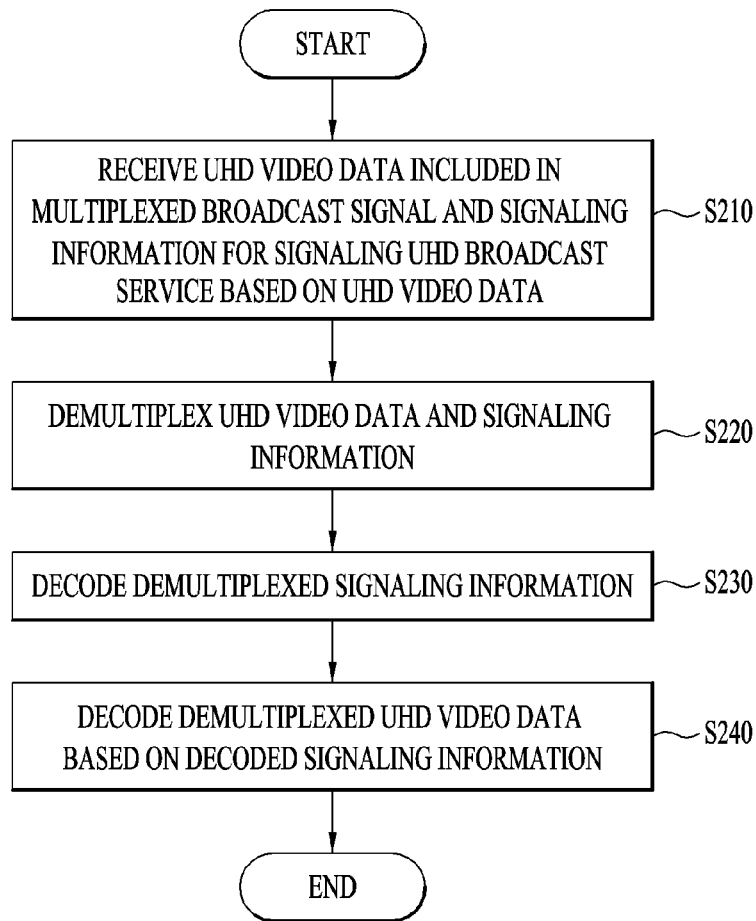
FIG. 19 is a flowchart illustrating a signal reception method according to one embodiment of the present invention.

FIG. 19 is a flowchart illustrating a signal reception method according to one embodiment of the present invention.

The signal reception device may receive UHD video data and signaling information for signaling a UHD broadcast service based on the UHD video data, both of which are included in a multiplexed broadcast signal (S210). The signal reception device may receive a stream via a clear QAM tuner capable of receiving an unencrypted digital cable channel.

The signal reception device may demultiplex UHD video data and signaling information (S220).

The signal reception device may decode the demultiplexed signaling information (S230). The signaling information may include identification information of Clear QAM UHD service. The signal reception device may identify detailed information on a UHD service using a descriptor included in a CVCT or detailed information on a UHD service included in a TVCT.

A method of identifying detailed information of a UHD service using a descriptor included in a CVCT was described with reference to FIGS. 3 to 8. A method of identifying detailed information on a UHD service included in a TVCT was described with reference to FIGS. 3, 6, 8 to 10, 12 and 13.

In addition, the signal reception device may identify a UHD video service included in video data using a DCCT and automatically perform change to a UHD channel. A method of signaling UHD detailed information to perform automatic change to a UHD channel using a DCCT was described with reference to FIGS. 14 to 17. When the signal reception device receives and serves an HD or SD channel, if there is a UHD channel corresponding to a received channel, the channel may be changed to the UHD channel according to user selection to perform a UHD service. A method of signaling information transmitted in a state of being included in the HD or SD channel for the UHD service was described with reference to FIGS. 7, 10 and 11. The signaling information for the UHD service is equally applicable to the signal transmission device.

The signal reception device may decode the demultiplexed UHD video data based on the decoded signaling information (S240).

Figure 20:
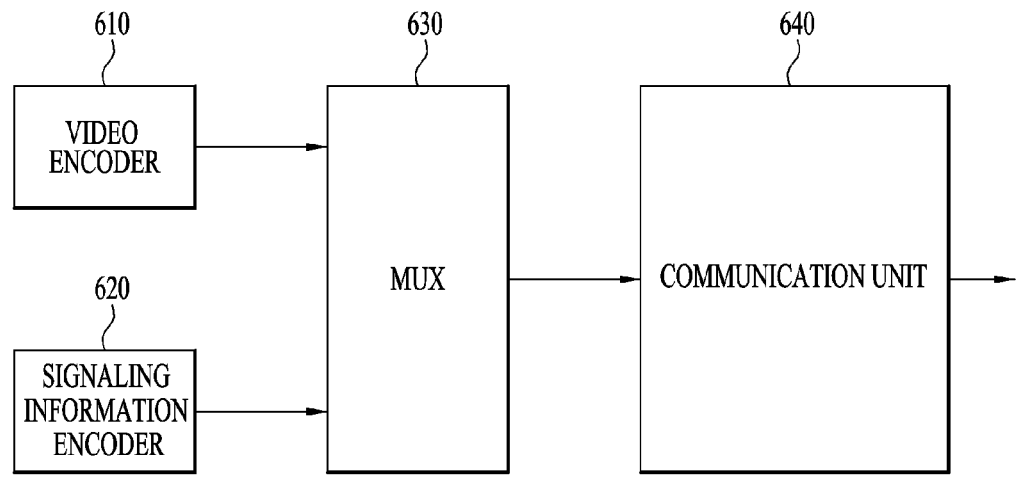
FIG. 20 is a block diagram of a signal transmission device according to one embodiment of the present invention.

FIG. 20 is a block diagram of a signal transmission device according to one embodiment of the present invention.

The video encoder 610 encodes UHD video data. For example, the encoded UHD video data may have resolution of 4 k, 8 k, 16 k, etc.

The signaling information decoder 620 encodes signaling information for signaling the UHD broadcast service based on the encoded UHD video data. The signaling information for the UHD service may be transmitted using the descriptor included in the CVCT or in a state of being included in the TVCT. The method of including and signaling detailed information on the UHD service in the CVCT was described with reference to FIGS. 3 to 8. The method of including and signaling detailed information on the UHD service in the TVCT was described with reference to FIGS. 3, 6, 8 to 10, 12 and 13.

In addition, the signal transmission device may signal automatic channel change information using the DCCT such that the signal reception device identifies the UHD video service included in the video data and performs automatic change to the UHD channel. The method of signaling UHD detailed information at the signal transmission device such that the signal reception device performs automatic change to the UHD channel was described with reference to FIGS. 14 to 17. In addition, when the signal transmission device transmits video data via the HD or SD channel, information on UHD channel or data corresponding to transmitted video channel or data may be transmitted using the HD or SD channel. The method of signaling information on the UHD service at the signal transmission device was described with reference to FIGS. 7, 10 and 11.

The mux 630 multiplexes the encoded video data and signaling information. The signaling information includes identification information of the Clear QAM UHD service.

The communication unit 640 transmits the multiplexed data.

Figure 21:
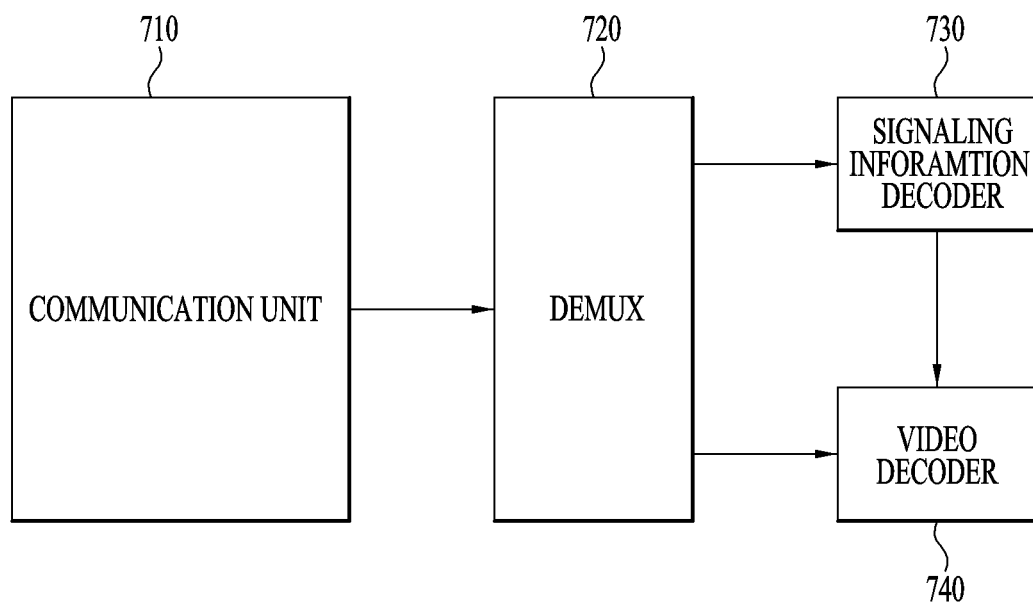
FIG. 21 is a block diagram of a signal reception device according to one embodiment of the present invention.

FIG. 21 is a block diagram of a signal reception device according to one embodiment of the present invention.

The communication unit 710 may receive UHD video data and signaling information for signaling a UHD video service based on the UHD video data, both of which are included in a multiplexed broadcast signal. The communication unit 710 may include a clear QAM tuner capable of receiving an unencrypted digital cable channel. That is, the communication unit 710 may include the clear QAM tuner 410 shown in FIG. 18.

The demux 720 may demultiplex the UHD video data and the signaling information. The demux 720 may correspond to the demux 420 shown in FIG. 18.

The signaling information decoder 730 may decode the demultiplexed signaling information. The signaling information decoder 730 may correspond to the signaling information decoder 440 shown in FIG. 18. The signaling information may include a CVCT or a TVCT. If an ATSC_private_information_descriptor is included in the CVCT, a UHD channel, an HD channel and an SD channel are distinguished to prevent duplicate reception. That is, the signal reception device may receive the UHD channel using a channel mode and a resolution field included in the ATSC_private_information_descriptor.

If the ATSC_private_information_descriptor is not included in the CVCT, a UHD channel, an HD channel and an SD channel are distinguished using the information included in the TVCT to prevent duplicate reception. That is, the signal reception device may receive information indicating that the UHD broadcast service is performed in the channel using the service_type.

The signal reception device may receive information indicating automatic change to the UHD service corresponding to the existing service (SD, HD, etc.) using the DCCT.

The video decoder 740 decodes the demultiplexed UHD video data based on the decoded signaling information. The video decoder 740 may be included in the resource decoder 500 of FIG. 18 and may correspond to the video decoder 520 of FIG. 18.

MODE FOR INVENTION

Industrial Applicability

The present invention is available in a broadcast and video signal processing field.

The invention claimed is:

1. A signal transmission method comprising:
generating a high definition (HD) component of an HD broadcast service and an ultra high definition (UHD) component of a UHD broadcast service,
wherein the HD component and the UHD component are different coded versions of the same media component;
generating a virtual channel table (VCT) for signaling the HD broadcast service and the UHD broadcast service and a directed channel change table (DCCT) for changing a channel automatically,
wherein the VCT includes channel number information for indicating a channel number of a channel associated with the HD broadcast service, source identification information for identifying the HD component associated with the channel and transport stream identification information for identifying a transport stream carrying the HD broadcast service,
wherein the VCT includes a descriptor including channel mode information indicating that the channel associated with the HD broadcast service is a clear quadrature amplitude modulation (QAM) channel and resolution information indicating a resolution of the HD broadcast service associated with the channel,
wherein the resolution information further indicates whether another channel associated with the UHD broadcast service which has a different resolution from the resolution of the HD broadcast service is provided,
wherein the VCT further includes a UHD linkage descriptor for accessing the another channel associated with the UHD broadcast service from the channel associated with the RD broadcast service,
wherein the UHD linkage descriptor includes information indicating whether the UHD broadcast service associated with the another channel is carried by a transport stream which is different from the transport stream carrying the HD broadcast service, information indicating a type of the UHD broadcast service, information identifying a transport stream carrying the UHD broadcast service, information identifying the UHD component associated with the another channel and information indicating a channel number of the another channel,
wherein the UHD linkage descriptor further includes information identifying a transport stream carrying a program association table (PAT) associated with the UHD broadcast service, information indicating a modulation mode for transmitting the UHD broadcast service and information indicating a carrier frequency for transmitting the UHD broadcast service,
wherein the PAT describes information for acquiring each service in a transport stream, and
wherein the DCCT includes sub type information indicating that the DCCT is a table for changing a current channel to a channel associated with the UHD broadcast service, selection type information indicating that criteria for selecting a channel to be changed are whether the channel to be changed is associated with the UHD broadcast service and selection channel information describing the UHD component associated with the channel to be changed;
multiplexing the HD component, the UHD component, the VCT and the DCCT to generate a broadcast signal; and
transmitting the broadcast signal.

2. The signal transmission method according to claim 1, wherein the selection channel information includes information indicating a codec type of the UHD component, information indicating a profile of the UHD component, information indicating a level of the UHD component, information indicating a resolution of the UHD component, information indicating a frame rate of the UHD component, information indicating a bit depth of the UHD component, information indicating a chroma sampling value of the UHD component, information indicating an aspect ratio of the UHD component and information indicating a tier of the UHD component.

3. The signal transmission method according to claim 1, wherein the VCT further includes service type information indicating a type of the UHD broadcast service, and
wherein the VCT further includes a service location descriptor including stream type information indicating a codec type of the UHD broadcast service.

4. The signal transmission method according to claim 1, wherein the VCT further includes a UHD descriptor including UHD metadata, and
wherein the UHD metadata includes information for indicating a codec type of the UHD component, information for indicating a frame rate of the UHD component and information for indicating an aspect ratio of the UHD component.

5. A signal reception method comprising:
receiving a broadcast signal including a high definition (HD) component of an HD broadcast service and an ultra high definition (UHD) component of a UHD broadcast service, a virtual channel table (VCT) for signaling the HD broadcast service, and the UHD broadcast service and a directed channel change table (DCCT) for changing a channel automatically,
wherein the HD component and the UHD component are different coded versions of the same media component, wherein the VCT includes channel number information for indicating a channel number of a channel associated with the HD broadcast service, source identification information for identifying the HD component associated with the channel and transport stream identification information for identifying a transport stream carrying the HD broadcast service, wherein the VCT includes a descriptor including channel mode information indicating that the channel associated with the HD broadcast service is a clear quadrature amplitude modulation (QAM) channel and resolution information indicating a resolution of the HD broadcast service associated with the channel, wherein the resolution information further indicates whether another channel associated with the UHD broadcast service which has a different resolution from the resolution of the HD broadcast service is provided, wherein the VCT further includes a UHD linkage descriptor for accessing the another channel associated with the UHD broadcast service from the channel associated with the UHD broadcast service, wherein the UHD linkage descriptor includes information indicating whether the UHD broadcast service associated with the another channel is carried by a transport stream which is different from the transport stream carrying the HD broadcast service, information indicating a type of the UHD broadcast service, information identifying a transport stream carrying the MD broadcast service, information identifying the UHD component associated with the another channel and information indicating a channel number of the another channel, wherein the UHD linkage descriptor further includes information identifying a transport stream carrying a program association table (PAT) associated with the UHD broadcast service, information indicating a modulation mode for transmitting the UHD broadcast service and information indicating a carrier frequency for transmitting the UHD broadcast service, wherein the PAT describes information for acquiring each service in a transport stream, and wherein the DCCT includes sub type information indicating that the DCCT is a table for changing a current channel to a channel associated with the UHD broadcast service, selection type information indicating that criteria for selecting a channel to be changed are whether the channel to be changed is associated with the UHD broadcast service and selection channel information describing the MID corn anent associated with the channel to be changed;

demultiplexing the HD component, the UHD component, the VCT and the DCCT;

decoding the VCT and the DCCT; and decoding the HD component and the UHD component based on the decoded VCT and DCCT.

6. The signal reception method according to claim 5, wherein the selection channel information includes information indicating a codec type of the UHD component, information indicating a profile of the UHD component, information indicating a level of the UHD component, information indicating a resolution of the UHD component, information indicating a frame rate of the UHD component, information indicating a bit depth of the UHD component, information indicating a chroma sampling value of the UHD component, information indicating an aspect ratio of the UHD component and information indicating a tier of the UHD component.

7. The signal reception method according to claim 5, wherein the VCT further includes service type information indicating a type of the UHD broadcast service, and wherein the VCT further includes service location descriptor including stream type information indicating a codec type of the UHD broadcast service.

8. The signal reception method according to claim 5, wherein the VCT further includes a UHD descriptor including UHD metadata, and wherein the UHD metadata includes information for indicating a codec type of the UHD component, information for indicating a frame rate of the UHD component and information for indicating an aspect ratio of the UHD component.

9. A signal transmission device comprising:

a video generator configured to generate a high definition (HD) component of an HD broadcast service and an ultra high definition (UHD) component of a UHD broadcast service, wherein the HD component and the UHD component are different coded versions of the same media component;

a signaling information generator configured to generate a virtual channel table (VCT) for signaling the HD broadcast service and the UHD broadcast service and a directed channel change table (DCCT) for changing a channel automatically, wherein the VCT includes channel number information for indicating a channel number of a channel associated with the HD broadcast service, source identification information for identifying the HD component associated with the channel and transport stream identification information for identifying a transport stream carrying the HD broadcast service, wherein the VCT includes a descriptor including channel mode information indicating that the channel associated with the HD broadcast service is clear quadrature amplitude modulation (QAM) channel and resolution information indicating a resolution of the HD broadcast service associated with the channel, wherein the resolution information further indicates whether another channel associated with the UHD broadcast service which has a different resolution from the resolution of the UHD broadcast service is provided, wherein the VCT further includes a UHD linkage descriptor for accessing the another channel associated with the UHD broadcast service from the channel associated with the HD broadcast service, wherein the UHD linkage descriptor includes information indicating whether the UHD broadcast service associated with the another channel is carried by a transport stream which is different from the transport stream carrying the HD broadcast service, information indicating a type of the UHD broadcast service, information identifying a transport stream carrying the UHD broadcast service, information identifying the UHD component associated with the another channel and information indicating a channel number of the another channel, wherein the UHD linkage descriptor further includes information identifying a transport stream carrying a program association table (PAT) associated with the UHD broadcast service, information indicating a modulation mode for transmitting the UHD broadcast service and information indicating a carrier frequency for transmitting the UHD broadcast service, wherein the PAT describes information for acquiring each service in a transport stream, and wherein the DCCT includes sub type information indicating that the DCCT is a table for changing a current channel to a channel associated with the UHD broadcast service, selection type information indicating that criteria for selecting a channel to be changed are whether the channel to be changed is associated with the UHD broadcast service and selection channel information describing the UHD component associated with the channel to be changed;

a multiplexer configured to multiplex the HD component, the UHD component, the VCT and the DCCT; and a communication unit configured to transmit the broadcast signal.

10. The signal transmission device according to claim 9, wherein the selection channel information includes information indicating a codec type of the UHD component, information indicating a profile of the UHD component, information indicating a level of the UHD component, information indicating a resolution of the UHD component, information indicating a frame rate of the UHD component, information indicating a bit depth of the UHD component, information indicating a chroma sampling value of the UHD component, information indicating an aspect ratio of the UHD component and information indicating a tier of the CUD component.

11. The signal transmission device according to claim 9, wherein the VCT further includes service type information indicating a type of the UHD broadcast service, and wherein the VCT further includes service location descriptor including stream type information indicating a codec type of the UHD broadcast service.

12. The signal transmission device according to claim 9, wherein the VCT further includes a UHD descriptor including UHD metadata, and wherein the UHD metadata includes information for indicating a codec type of the UHD component, information for indicating a frame rate of the UHD component and information for indicating an aspect ratio of the UHD component.

13. A signal reception device comprising:

a communication unit configured to receive a broadcast signal including a high definition (HD) component of an HD broadcast service and an ultra high definition (UHD) component of a UHD broadcast service, a virtual channel table (VCT) for signaling the RD broadcast service and the UHD broadcast service and a directed channel change table (DCCT) for changing a channel automatically, wherein the HD component and the UHD component are different coded versions of the same media component, wherein the VCT includes channel number information for indicating a channel number of a channel associated with the HD broadcast service, source identification information for identifying the HD component associated with the channel and transport stream identification information for identifying a transport stream carrying the HD broadcast service, wherein the VCT includes a descriptor including channel mode information indicating that the channel associated with the HD broadcast service is clear quadrature amplitude modulation (QAM) channel and resolution information indicating a resolution of the HD broadcast service associated with the channel, wherein the resolution information further indicates whether another channel associated with the UHD broadcast service which has a different resolution from the resolution of the HD broadcast service is provided, wherein the VCT further includes a UHD linkage descriptor for accessing the another channel associated with the UHD broadcast service from the channel associated with the HD broadcast service, wherein the UHD linkage descriptor includes information indicating whether the UHD broadcast service associated with the another channel is carried by a transport stream which is different from the transport stream carrying the HD broadcast service, information indicating a type of the UHD broadcast service, information identifying a transport stream carrying the UHD broadcast service, information identifying the UHD component associated with the another channel and information indicating a channel number of the another channel, wherein the UHD linkage descriptor further includes information identifying a transport stream carrying a program association table (PAT) associated with the UHD broadcast service, information indicating a modulation mode for transmitting the UHD broadcast service and information indicating a carrier frequency for transmitting the UHD broadcast service, wherein the PAT describes information for acquiring each service in a transport stream, and wherein the DCCT includes sub type information indicating that the DCCT is a table for changing a current channel to a channel associated with the UHD broadcast service, selection type information indicating that criteria for selecting a channel to be changed are whether the channel to be changed is associated with the UHD broadcast service and selection channel information describing the UHD component associated with the channel to be changed;

a demultiplexer configured to demultiplex the HD component, the UHD component, the VCT and the DCCT;

a signaling information decoder configured to decode the VCT and the DCCT; and a video decoder configured to decode the HD component and the UHD component based on the decoded VCT and DCCT.

14. The signal reception device according to claim 13, wherein the selection channel information includes information indicating a codec type of the UHD component, information indicating a profile of the UHD component, information indicating a level of the UHD component, information indicating a resolution of the UHD component, information indicating a frame rate of the UHD component, information indicating a bit depth of the UHD component, information indicating a chroma sampling value of the UHD component, information indicating an aspect ratio of the UHD component and information indicating a tier of the UHD component.

15. The signal reception device according to claim 13, wherein the VCT further includes service type information indicating a type of the UHD broadcast service, and wherein the VCT further includes service location descriptor including stream type information indicating a codec type of the UHD broadcast service.

* * * * *